United States Patent
Nguyen et al.

(10) Patent No.: US 9,628,286 B1
(45) Date of Patent: Apr. 18, 2017

(54) TELEVISION RECEIVER AND HOME AUTOMATION SYSTEM AND METHODS TO ASSOCIATE DATA WITH NEARBY PEOPLE

(71) Applicant: Echostar Technologies L.L.C., Englewood, CO (US)

(72) Inventors: Phuc H. Nguyen, Parker, CO (US); Christopher William Bruhn, Aurora, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/050,958

(22) Filed: Feb. 23, 2016

(51) Int. Cl.
*G08B 13/196* (2006.01)
*H04L 12/28* (2006.01)

(52) U.S. Cl.
CPC .... *H04L 12/2834* (2013.01); *G08B 13/19613* (2013.01); *G08B 13/19615* (2013.01);
(Continued)

(58) Field of Classification Search
CPC  G08B 13/00; G08B 13/196; G08B 13/19608; G08B 13/19613; G08B 13/19615; G08B 13/19617; G08B 13/19665; G08B 13/19669; G08B 13/19678; G08B 13/19682; H04L 12/2803; H04L 12/2816; H04L 12/2818; H04L 12/282; H04L 12/2834; G01S 19/13;
(Continued)

(56) References Cited

U.S. PATENT DOCUMENTS

| | | |
|---|---|---|
| 4,386,436 A | 5/1983 | Kocher et al. |
| 4,581,606 A | 4/1986 | Mallory |
| | (Continued) | |

FOREIGN PATENT DOCUMENTS

| | | |
|---|---|---|
| CA | 2 267 988 A1 | 4/1998 |
| CN | 105814555 A | 7/2016 |
| | (Continued) | |

OTHER PUBLICATIONS

"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.

(Continued)

*Primary Examiner* — Van Trieu
(74) *Attorney, Agent, or Firm* — Kilpatrick Townsend & Stockton LLP

(57) ABSTRACT

The disclosure relates to systems and methods for identifying a person using a home automation system, and using data collected from a television distribution system and data collected by sensors in a home automation system to identify a person. An example method or system includes receiving television programming from a television service provider, detecting target data in the television programming associated with a virtual person, identifying characteristics of the virtual person, detecting home automation data associated with a local person, identifying characteristics of the local person, comparing the characteristics of the virtual person and the characteristics of the local person, and transmitting a portion of the target data and a portion of the home automation data to an electronic device for displaying.

20 Claims, 13 Drawing Sheets

(52) U.S. Cl.
CPC . *G08B 13/19678* (2013.01); *G08B 13/19682* (2013.01); *H04L 12/282* (2013.01)

(58) Field of Classification Search
CPC .......... G01S 19/14; G01S 19/16; G01S 19/35; G01S 19/36; G01S 19/37
See application file for complete search history.

(56) References Cited

U.S. PATENT DOCUMENTS

| | | | |
|---|---|---|---|
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,119,088 A | 9/2000 | Ciluffo |
| 6,182,094 B1 | 1/2001 | Humpleman et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,502,166 B1 | 12/2002 | Cassidy |
| 6,529,230 B1 | 3/2003 | Chong |
| 6,553,375 B1 | 4/2003 | Huang et al. |
| 6,662,282 B2 | 12/2003 | Cochran |
| 6,756,998 B1 | 6/2004 | Bilger |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,088,238 B2 | 8/2006 | Karaoguz et al. |
| 7,103,545 B2 | 9/2006 | Furuta |
| 7,143,298 B2 | 11/2006 | Wells et al. |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,590,703 B2 | 9/2009 | Cashman et al. |
| 7,640,351 B2 | 12/2009 | Reckamp et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 5/2012 | Lucas et al. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,413,204 B2 | 4/2013 | White et al. |
| 8,498,572 B1 | 7/2013 | Schooley et al. |
| 8,516,087 B2 | 8/2013 | Wilson et al. |
| 8,550,368 B2 | 10/2013 | Butler et al. |
| 8,619,136 B2 | 12/2013 | Howarter et al. |
| 8,644,525 B2 | 2/2014 | Bathurst et al. |
| 8,645,327 B2 | 2/2014 | Falkenburg et al. |
| 8,750,576 B2 | 6/2014 | Huang et al. |
| 8,780,201 B1 | 7/2014 | Scalisi et al. |
| 8,786,698 B2 | 7/2014 | Chen et al. |
| 8,799,413 B2 | 8/2014 | Taylor et al. |
| 8,898,709 B2 | 11/2014 | Crabtree |
| 8,930,700 B2 | 1/2015 | Wielopolski |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,246,921 B1 | 1/2016 | Vlaminck et al. |
| 9,462,041 B1 | 10/2016 | Hagins et al. |
| 9,495,860 B2 | 11/2016 | Lett |
| 2001/0012998 A1 | 8/2001 | Jouet et al. |
| 2002/0019725 A1 | 2/2002 | Petite |
| 2002/0063633 A1 | 5/2002 | Park |
| 2002/0080238 A1* | 6/2002 | Ohmura ............ G08B 13/1966 348/143 |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0201900 A1 | 10/2003 | Bachinski et al. |
| 2004/0019489 A1 | 1/2004 | Funk et al. |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0264698 A1 | 12/2005 | Eshleman |
| 2005/0289614 A1 | 12/2005 | Baek et al. |
| 2006/0011145 A1 | 1/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0142022 A1 | 6/2007 | Madonna et al. |
| 2007/0146545 A1 | 6/2007 | Iwahashi |
| 2007/0157258 A1 | 7/2007 | Jung et al. |
| 2007/0192486 A1 | 8/2007 | Wilson et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2008/0021971 A1 | 1/2008 | Halgas |
| 2008/0022322 A1 | 1/2008 | Grannan et al. |
| 2008/0062258 A1 | 3/2008 | Bentkovski et al. |
| 2008/0062965 A1 | 3/2008 | Silva et al. |
| 2008/0109095 A1 | 5/2008 | Braithwaite et al. |
| 2008/0114963 A1 | 5/2008 | Cannon et al. |
| 2008/0123825 A1 | 5/2008 | Abramson et al. |
| 2008/0140736 A1 | 6/2008 | Jarno |
| 2008/0163330 A1 | 7/2008 | Sparrell |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0069038 A1 | 3/2009 | Olague et al. |
| 2009/0112541 A1* | 4/2009 | Anderson ............ G09B 19/0076 703/11 |

(56) References Cited

U.S. PATENT DOCUMENTS

| | | |
|---|---|---|
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0249428 A1 | 10/2009 | White et al. |
| 2009/0271203 A1 | 10/2009 | Resch et al. |
| 2010/0031286 A1 | 2/2010 | Gupta et al. |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0211546 A1 | 8/2010 | Grohman et al. |
| 2010/0283579 A1 | 11/2010 | Kraus et al. |
| 2010/0321151 A1 | 12/2010 | Matsuura et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0150432 A1 | 6/2011 | Paul et al. |
| 2011/0156862 A1 | 6/2011 | Langer |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0295396 A1 | 12/2011 | Chinen et al. |
| 2012/0019388 A1 | 1/2012 | Kates et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0094696 A1 | 4/2012 | Ahn et al. |
| 2012/0124456 A1 | 5/2012 | Perez et al. |
| 2012/0154108 A1 | 6/2012 | Sugaya |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0316876 A1 | 12/2012 | Jang et al. |
| 2012/0326835 A1 | 12/2012 | Cockrell et al. |
| 2013/0046800 A1 | 2/2013 | Assi et al. |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0124192 A1* | 5/2013 | Lindmark ............. G06F 17/274 704/9 |
| 2013/0138757 A1 | 5/2013 | Ferron |
| 2013/0152139 A1 | 6/2013 | Davis et al. |
| 2013/0204408 A1 | 8/2013 | Thiruvengada et al. |
| 2013/0267383 A1 | 10/2013 | Watterson |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0095684 A1 | 4/2014 | Nonaka et al. |
| 2014/0101465 A1 | 4/2014 | Wang et al. |
| 2014/0160360 A1 | 6/2014 | Hsu et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0215505 A1 | 7/2014 | Balasubramanian et al. |
| 2014/0218517 A1 | 8/2014 | Kim et al. |
| 2014/0266669 A1 | 9/2014 | Fadell et al. |
| 2014/0266684 A1 | 9/2014 | Poder et al. |
| 2014/0310075 A1 | 10/2014 | Ricci |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0029096 A1 | 1/2015 | Ishihara |
| 2015/0054910 A1 | 2/2015 | Offen et al. |
| 2015/0084770 A1 | 3/2015 | Xiao et al. |
| 2015/0106866 A1 | 4/2015 | Fujita |
| 2015/0143408 A1 | 5/2015 | Sallas |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy, III et al. |
| 2015/0172742 A1 | 6/2015 | Richardson |
| 2015/0198941 A1* | 7/2015 | Pederson ............... G06Q 30/00 700/275 |
| 2015/0281824 A1 | 10/2015 | Nguyen et al. |
| 2015/0309487 A1 | 10/2015 | Lyman |
| 2015/0341599 A1* | 11/2015 | Carey .................... H04N 7/181 348/150 |
| 2016/0063854 A1 | 3/2016 | Burton et al. |
| 2016/0066046 A1 | 3/2016 | Mountain |
| 2016/0091471 A1 | 3/2016 | Benn |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy, III |
| 2016/0203700 A1 | 7/2016 | Bruhn et al. |
| 2016/0286327 A1 | 9/2016 | Marten |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2016/034880 A1 | 3/2016 |
| WO | 2016/066399 A1 | 5/2016 |
| WO | 2016/066442 A1 | 5/2016 |

OTHER PUBLICATIONS

Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.

Author Unknown, "App for Samsung Smart TV®," Crestron Electronics, Inc., accessed on Jul. 14, 2014, 3 pages. Retrieved from http://www.creston.com/products/smart tv television apps/.

Author Unknown, "AllJoyn Onboarding Service Frameworks," Qualcomm Connected Experiences, Inc., accessed on Jul. 15, 2014, 9 pages. Retrieved from https://www.alljoyn.org.

"Do you want to know how to find water leaks? Use a Bravedo Water Alert Flow Monitor to find out!", Bravedo.com, accessed Dec. 16, 2014, 10 pages. Retrieved from http://bravedo.com/.

"Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.

(56) References Cited

OTHER PUBLICATIONS

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
"International Building Code Excerpts, Updated with recent code changes that impact electromagnetic locks," Securitron, Assa Abloy, IBC/IFC 2007 Supplement and 2009, "Finally—some relief and clarification", 2 pages.Retrieved from: www.securitron.com/Other/.../New_IBC-IFC_Code_Language.pdf.
"Introduction to Ultrasonic Doppler Flowmeters," Omega Engineering inc., accessed on Dec. 16, 2014, 3 pages. Retrieved from http://www.omega.com/prodinfo/ultrasonicflowmeters.html.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
International Search Report and Written Opinion for PCT/EP2011/051608 mailed on May 30, 2011, 13 pages.
International Preliminary Report on Patentability for PCT/EP2011/051608 mailed Aug. 16, 2012, 8 pages.
International Search Report and Written Opinion for PCT/US2014/053876 mailed Nov. 26, 2014, 8 pages.
International Search Report and Written Opinion for PCT/US2014/055441 mailed Dec. 4, 2014, 10 pages.
International Search Report and Written Opinion for PCT/US2014/055476 mailed Dec. 30, 2014, 10 pages.
International Search Report and Written Opinion for PCT/EP2015/070286 mailed Nov. 5, 2015, 13 pages.
International Search Report and Written Opinion for PCT/GB2015/052544 mailed Nov. 6, 2015, 10 pages.
International Search Report and Written Opinion for PCT/GB2015/052457 mailed Nov. 13, 2015, 11 pages.
International Search Report and Written Opinion for PCT/EP2015/073299 mailed Jan. 4, 2016, 12 pages.
International Search Report and Written Opinion for PCT/EP2015/073936 mailed Feb. 4, 2016, all pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. MX/a/2012/008882, 1 page.
U.S. Appl. No. 14/470,352, filed Aug. 27, 2014 Non Final Office Action mailed Nov. 20, 2015, 28 pages.
U.S. Appl. No. 12/700,310, filed Feb. 4, 2010, Office Action mailed May 4, 2012, 15 pages.
U.S. Appl. No. 12/700,310, filed Feb. 4, 2010, Final Office Action mailed Oct. 10, 2012, 16 pages.
U.S. Appl. No. 12/700,310, filed Feb. 4, 2010 Non-Final Office Action mailed Apr. 1, 2013, 16 pages.
U.S. Appl. No. 12/700,310, filed Feb. 4, 2010 Non-Final Office Action mailed Oct. 15, 2013, 15 pages.
U.S. Appl. No. 12/700,310, filed Feb. 4, 2010 Final Office Action mailed Feb. 28, 2014, 17 pages.
U.S. Appl. No. 12/700,310, filed Feb. 4, 2010 Non-Final Office Action mailed Aug. 14, 2014, 18 pages.
U.S. Appl. No. 12/700,310, filed Feb. 4, 2010 Non-Final Office Action mailed Mar. 11, 2015, 35 pages.
U.S. Appl. No. 12/700,310, filed Feb. 4, 2010 Final Office Action mailed Oct. 26, 2015, 19 pages.
U.S. Appl. No. 12/700,408, filed Feb. 4, 2010, Notice of Allowance mailed Jul. 28, 2012, 8 pages.
U.S. Appl. No. 13/680,934, filed Nov. 19, 2012,Non-Final Office Action mailed Oct. 2, 2013, 7 pages.
U.S. Appl. No. 13/680,934, filed Nov. 19, 2012,Final Office Action mailed Feb. 10, 2014, 13 pages.
U.S. Appl. No. 13/680,934, filed Nov. 19, 2012,Notice of Allowance mailed Apr. 30, 2014, 9 pages.
U.S. Appl. No. 13/680,934, filed Nov. 19, 2012, Notice of Allowance mailed Jul. 25, 2014, 12 pages.
U.S. Appl. No. 14/107,132, filed Dec. 16, 2013, Non Final Office Action mailed May 27, 2015, 26 pages.
U.S. Appl. No. 14/107,132, filed Dec. 16, 2013, Final Rejection mailed Dec. 16, 2015, 32 pages.
U.S. Appl. No. 14/485,188, filed Sep. 12, 2014, Pre-Interview First Office Action mailed Jul. 29, 2015, 20 pages.
U.S. Appl. No. 14/485,188, filed Sep. 12, 2014, Pre-Interview First Office Action mailed Oct. 1, 2015, 10 pages.
U.S. Appl. No. 14/485,188, filed Sep. 12, 2014, Final Rejection mailed Feb. 23, 2016, 22 pages.
U.S. Appl. No. 14/567,348, filed Dec. 11, 2014, Preinterview first office action mailed Jan. 20, 2016, 23 pages.
U.S. Appl. No. 14/470,352, filed Aug. 27, 2014 Final Office Action mailed Mar. 17, 2016, all pages.
U.S. Appl. No. 14/567,765, filed Dec. 11, 2014, Preinterview first office action mailed Apr. 8, 2016, 30 pages.
U.S. Appl. No. 14/577,717, filed Dec. 19, 2014, Preinterview first office action mailed Apr. 4, 2016, 29 pages.
U.S. Appl. No. 14/584,075, filed Dec. 29, 2014, Non-Final Rejection mailed Apr. 1, 2016, 40 pages.
International Search Report and Written Opinion for PCT/US2016/028126 mailed Jun. 3, 2016, all pages.
U.S. Appl. No. 12/700,310, filed Feb. 4, 2010 Non-Final Office Action mailed Jun. 16, 2016, 30 pages.
U.S. Appl. No. 14/528,739, filed Oct. 30, 2014 Notice of Allowance mailed Jun. 23, 2016, 34 pages.
U.S. Appl. No. 14/485,188, filed Sep. 12, 2014, Non-Final Rejection mailed Jun. 17, 2016, 29 pages.
U.S. Appl. No. 14/710,331, filed May 12, 2015, Non-Final Rejection mailed May 20, 2016, 42 pages.
International Preliminary Report on Patentability for PCT/US2014/055441 issued Jun. 14, 2016, 8 pages.
International Preliminary Report on Patentability for PCT/US2014/053876 issued Jun. 14, 2016, 7 pages.
International Preliminary Report on Patentability for PCT/US2014/055476 issued Jun. 14, 2016, 9 pages.
U.S. Appl. No. 12/700,310, filed Feb. 4, 2010 Notice of Allowance mailed Nov. 8, 2016, all pages.
U.S. Appl. No. 14/567,765, filed Dec. 11, 2014 First Action interview mailed Oct. 18, 2016, all pages.
U.S. Appl. No. 14/584,075, filed Dec. 29, 2014, Final Rejection mailed Oct. 6, 2016, all pages.
U.S. Appl. No. 14/566,977, filed Dec. 11, 2014, Non Final Rejection mailed Oct. 3, 2016, all pages.
U.S. Appl. No. 14/567,754, filed Dec. 11, 2014, Non Final Rejection mailed Nov. 4, 2016, all pages.
U.S. Appl. No. 14/567,770, filed Dec. 11, 2014, Non Final Rejection mailed Nov. 4, 2016, all pages.
U.S. Appl. No. 14/671,299, filed Mar. 27, 2015, Non Final Rejection mailed Oct. 28, 2016, all pages.
U.S. Appl. No. 14/476,377, filed Sep. 3, 2014, Non-Final Rejection mailed Nov. 7, 2016, all pages.
Office Action for EP14868928.4 dated Sep. 23, 2016, all pages.
U.S. Appl. No. 14/470,352, filed Aug. 27, 2014 Non Final Office Action mailed Aug. 26, 2016, all pages.
U.S. Appl. No. 14/107,132, filed Dec. 16, 2013, Non Final Office Action mailed Jul. 18, 2016, all pages.
U.S. Appl. No. 14/715,248, filed May 18, 2015, Non-Final Rejection mailed Jul. 19, 2016, 34 pages.

(56) References Cited

OTHER PUBLICATIONS

U.S. Appl. No. 14/567,783, filed Dec. 11, 2014, Non Final Rejection mailed Aug. 23, 2016, all pages.

* cited by examiner

TELEVISION RECEIVER AND HOME AUTOMATION SYSTEM AND METHODS TO ASSOCIATE DATA WITH NEARBY PEOPLE

TECHNICAL FIELD

The present technology relates to television receiver and home automation system and methods to associate data with nearby people. More specifically, the present technology relates to using data collected from a television distribution system and data collected by sensors in a home automation system to identify nearby people.

BACKGROUND

Home automation systems provide a plethora of valuable benefits. From monitoring ongoing activities to securing the home, these systems can be configured to monitor many activities. Typical home automation or home security systems may provide protection to a home from intruders using sensors and general rules for when an intruder may be present. However, typical home automation or home security systems do not identify specific people that may be known or advertised to the general public via television programming, the internet, or other social media.

Thus, there is a need for improved methods and systems for identifying when a person, identified as a potential threat by a news source or otherwise advertised to the general public, is located in close proximity to a home automation system or home security system, and notifying a user of the home automation or home security system and/or the authorities about the potential threat.

SUMMARY

Embodiments of the present technology are directed to a computer-implemented method. The method may include receiving, at a television receiver connected to a home automation system, television programming from a television service provider; detecting, by the television receiver, target data in the television programming, wherein target data includes data associated with a virtual person; identifying one or more characteristics of the virtual person using the target data; storing the target data and characteristics in a database of target data, wherein the characteristics are associated with the target data in the database; detecting, by a sensor of the home automation system, home automation data associated with a local person, wherein the home automation data includes video or audio data associated with the local person; identifying one or more characteristics of the local person using the home automation data; comparing the characteristics of the virtual person and the characteristics of the local person; and transmitting a portion of the target data and a portion of the home automation data to an electronic device, wherein when the portion of the target data and the portion of the home automation data are received, the portion of the target data and the portion of the home automation data are displayable on a display device.

In alternative aspects, the method further comprises receiving, at the television receiver, additional data associated with the virtual person, wherein the additional data is received from an internet website. In alternative aspects, the target data includes a picture of a suspected criminal shown in a television program. In alternative aspects, the one or more characteristics of the local person include facial features associated with the local person. In alternative aspects, the method further comprises transmitting an alert communication, wherein the alert communication includes an alert to a law enforcement organization, and wherein the alert communication includes the portion of the target data and the portion of the home automation data. In alternative aspects, the one or more characteristics of the local person includes features of a vocal sound associated with the person. In alternative aspects, the method further comprises determining, using the comparison of the characteristics of the virtual person and the characteristics of the local person, that the characteristics of the virtual person and the characteristics of the local person have a certain number of matching characteristics, and determining that the certain number of matching characteristics meet or exceed a threshold number of matching characteristics. In alternative aspects, the method further comprises compiling, at the television receiver, historical home automation data collected over a period of time, wherein the threshold number of matching characteristics dynamically adjusts based on the historical home automation data. In alternative aspects, detecting the target data in the television programming includes identifying key words within a television program that are associated with a potential virtual person. In alternative aspects, detecting the target data in the television programming includes receiving an input from a user of the television receiver, wherein the input from the user includes an indication that the virtual person is included in a television program being shown on a display connected to the television receiver.

Alternative embodiments of the present technology are directed to a television receiver, comprising one or more processors, a wireless transceiver communicatively coupled to the one or more processors, and a non-transitory computer readable storage medium communicatively coupled to the one or more processors, wherein the non-transitory computer readable storage medium includes instructions that, when executed by the one or more processors, cause the one or more processors to perform operations. The operations may include receiving, at a television receiver connected to a home automation system, television programming from a television service provider; detecting, by the television receiver, target data in the television programming, wherein target data includes data associated with a virtual person; identifying one or more characteristics of the virtual person using the target data; storing the target data and characteristics in a database of target data, wherein the characteristics are associated with the target data in the database; detecting, by a sensor of the home automation system, home automation data associated with a local person, wherein the home automation data includes video or audio data associated with the local person; identifying one or more characteristics of the local person using the home automation data; comparing the characteristics of the virtual person and the characteristics of the local person; and transmitting a portion of the target data and a portion of the home automation data to an electronic device, wherein when the portion of the target data and the portion of the home automation data are received, the portion of the target data and the portion of the home automation data are displayable on a display device.

In alternative aspects, the operations further include receiving, at the television receiver, additional data associated with the virtual person, wherein the additional data is received from an internet website. In alternative aspects, the target data includes a picture of a suspected criminal shown in a television program. In alternative aspects, the one or more characteristics of the local person include facial features associated with the local person. In alternative aspects, the operations further include transmitting an alert communication, wherein the alert communication includes an alert to a law enforcement organization, and wherein the alert communication includes the portion of the target data and the portion of the home automation data. In alternative aspects, the one or more characteristics of the local person includes features of a vocal sound associated with the person. In alternative aspects, the operations further include determining, using the comparison of the characteristics of the virtual person and the characteristics of the local person, that the characteristics of the virtual person and the characteristics of the local person have a certain number of matching characteristics, and determining that the certain number of matching characteristics meet or exceed a threshold number of matching characteristics. In alternative aspects, the operations further include compiling, at the television receiver, historical home automation data collected over a period of time, wherein the threshold number of matching characteristics dynamically adjusts based on the historical home automation data. In alternative aspects, detecting the target data in the television programming includes identifying key words within a television program that are associated with a potential virtual person. In alternative aspects, detecting the target data in the television programming includes receiving an input from a user of the television receiver, wherein the input from the user includes an indication that the virtual person is included in a television program being shown on a display connected to the television receiver.

Alternative embodiments of the present technology are directed to a non-transitory computer readable medium comprising instructions that, when executed by one or more processors, cause the one or more processors to perform operations. The operations may include receiving, at a television receiver connected to a home automation system, television programming from a television service provider; detecting, by the television receiver, target data in the television programming, wherein target data includes data associated with a virtual person; identifying one or more characteristics of the virtual person using the target data; storing the target data and characteristics in a database of target data, wherein the characteristics are associated with the target data in the database; detecting, by a sensor of the home automation system, home automation data associated with a local person, wherein the home automation data includes video or audio data associated with the local person; identifying one or more characteristics of the local person using the home automation data; comparing the characteristics of the virtual person and the characteristics of the local person; and transmitting a portion of the target data and a portion of the home automation data to an electronic device, wherein when the portion of the target data and the portion of the home automation data are received, the portion of the target data and the portion of the home automation data are displayable on a display device.

In alternative aspects, the operations further include receiving, at the television receiver, additional data associated with the virtual person, wherein the additional data is received from an internet website. In alternative aspects, the target data includes a picture of a suspected criminal shown in a television program. In alternative aspects, the one or more characteristics of the local person include facial features associated with the local person. In alternative aspects, the operations further include transmitting an alert communication, wherein the alert communication includes an alert to a law enforcement organization, and wherein the alert communication includes the portion of the target data and the portion of the home automation data. In alternative aspects, the one or more characteristics of the local person includes features of a vocal sound associated with the person. In alternative aspects, the operations further include determining, using the comparison of the characteristics of the virtual person and the characteristics of the local person, that the characteristics of the virtual person and the characteristics of the local person have a certain number of matching characteristics, and determining that the certain number of matching characteristics meet or exceed a threshold number of matching characteristics. In alternative aspects, the operations further include compiling, at the television receiver, historical home automation data collected over a period of time, wherein the threshold number of matching characteristics dynamically adjusts based on the historical home automation data. In alternative aspects, detecting the target data in the television programming includes identifying key words within a television program that are associated with a potential virtual person. In alternative aspects, detecting the target data in the television programming includes receiving an input from a user of the television receiver, wherein the input from the user includes an indication that the virtual person is included in a television program being shown on a display connected to the television receiver.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

A television receiver may serve as a host for a home automation system. By using a television receiver to host a home automation system, various advantages may be realized. Many of these advantages are discussed below with respect to FIGS. 1-13.

Figure 1:
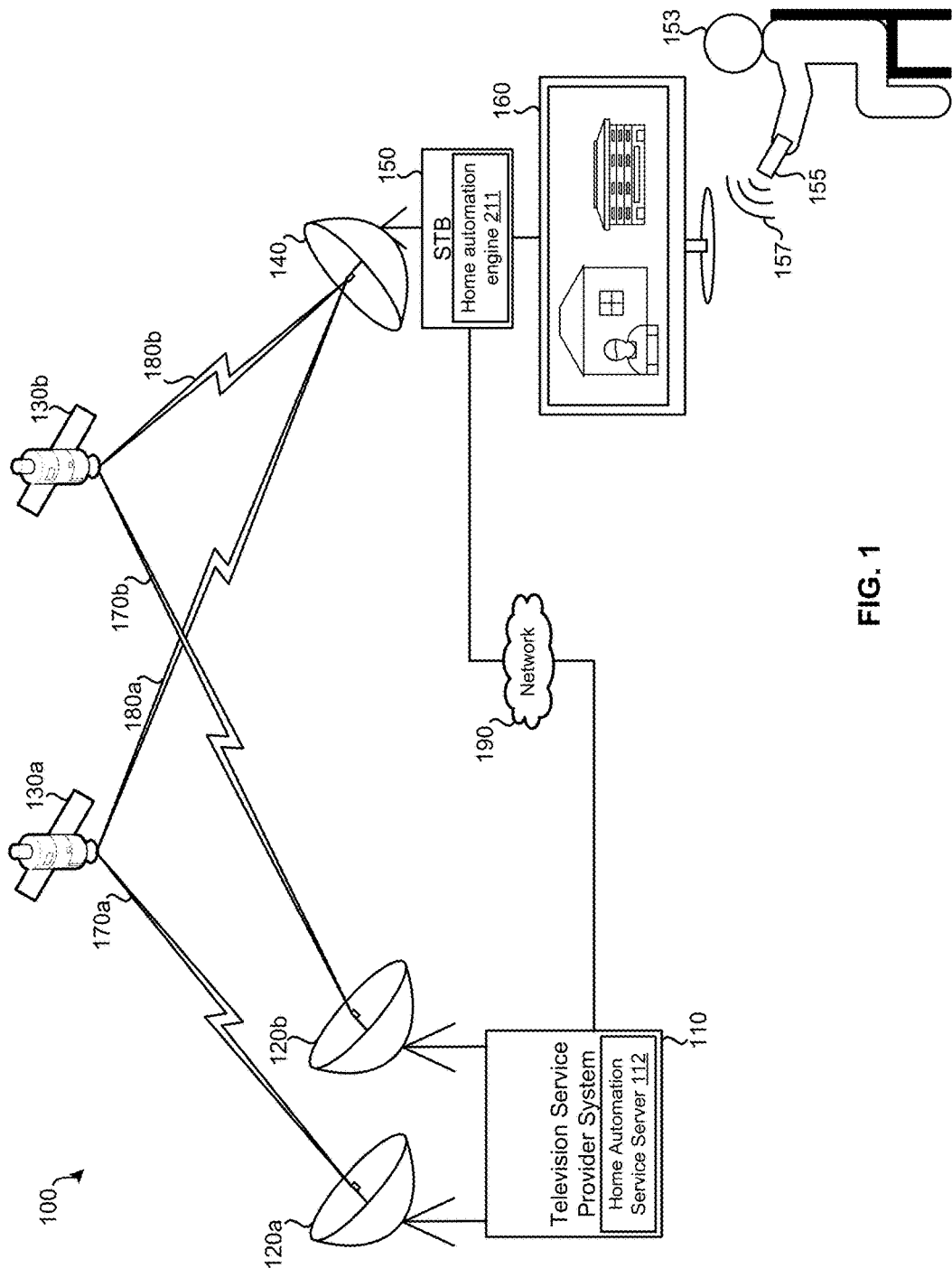
FIG. 1 shows a simplified media service system that may be used in accordance with embodiments of the present technology.

FIG. 1 illustrates an embodiment of a satellite television distribution system 100. While a home automation system may be incorporated with various types of television receivers, various embodiments may be part of a satellite-based television distribution system. Cable, IP-based, wireless, and broadcast focused systems are also possible. Satellite television distribution system 100 may include: television service provider system 110, satellite transmitter equipment 120, satellites 130, satellite dish 140, television receiver 150, home automation service server 112, and display device 160. The display device 160 can be controlled by a user 153 using a remote control device 155 that can send wired or wireless signals 157 to communicate with the STB 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170*a* represents a signal between satellite transmitter equipment 120 and satellite 130*a*. Uplink signal 170*b* represents a signal between satellite transmitter equipment 120 and satellite 130*b*. Each of uplink signals 170 may contain streams of one or more different television channels. For example, uplink signal 170*a* may contain a first group of television channels, while uplink signal 170*b* contains a second group of television channels. Each of these television channels may be scrambled such that unauthorized persons are prevented from accessing the television channels.

Downlink signal 180*a* represents a signal between satellite 130*a* and satellite dish 140. Downlink signal 180*b* represents a signal between satellite 130*b* and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180*a* may be a first transponder stream containing a first group of television channels, while downlink signal 180*b* may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180*a* and downlink signal 180*b*, being received by satellite dish 140 and distributed to television receiver 150. For a first group of television channels, satellite dish 140 may receive downlink signal 180*a* and for a second group of channels, downlink signal 180*b* may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

Figure 2:
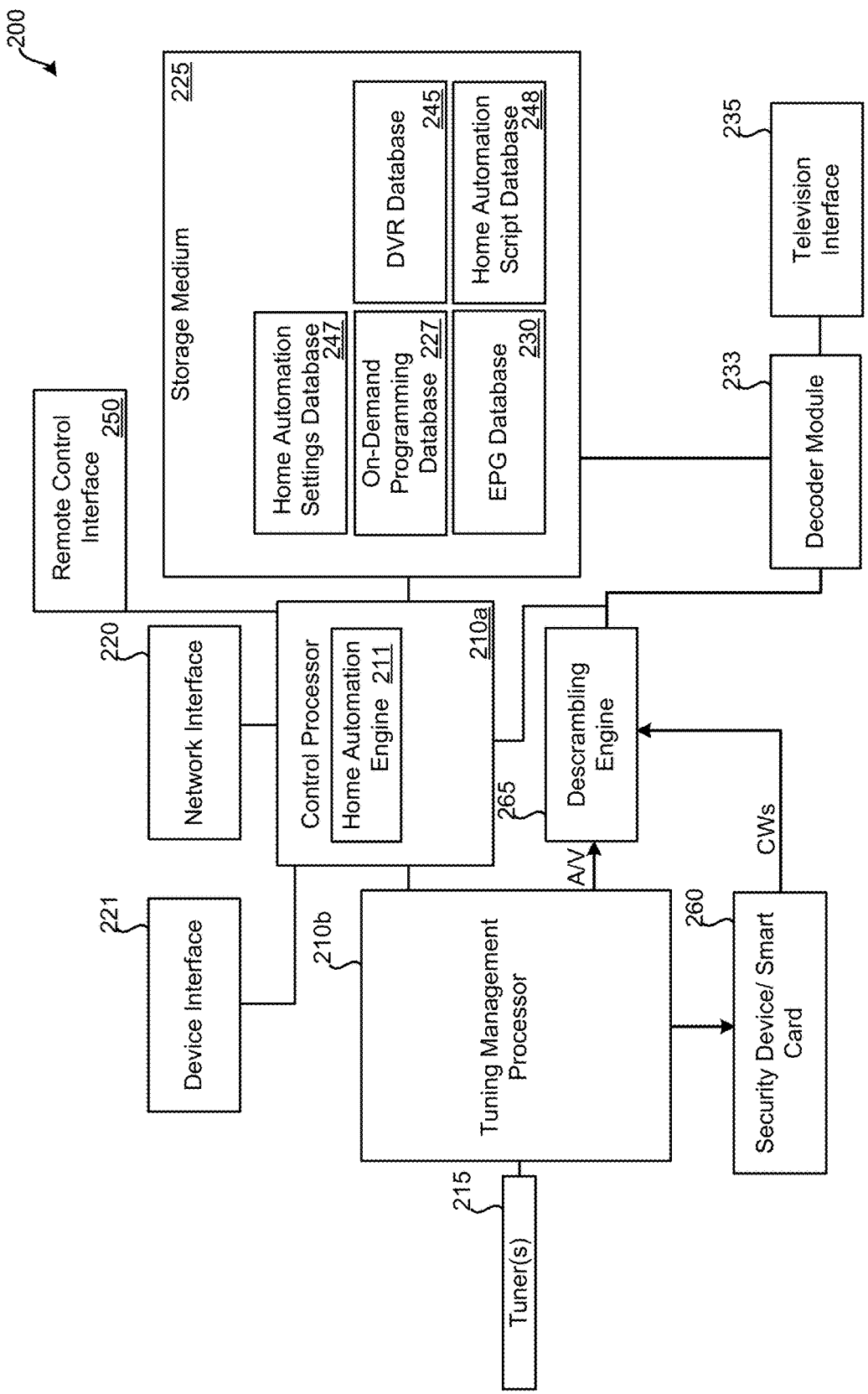
FIG. 2 illustrates an exemplary electronic device that may be used in accordance with embodiments of the present technology.

FIG. 2 illustrates an embodiment of a television receiver 200, which may represent television receiver 150 of FIG. 1. Television receiver 200 may be configured to function as a host for a home automation system either alone or in conjunction with a communication device. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 200 may be incorporated as part of a television, such as display device 160 of FIG. 1. Television receiver 200 may include: processors 210, which may include control processor 210*a*, tuning management processor 210*b*, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210*b*. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210*a*.

Control processor 210*a* may communicate with tuning management processor 210*b*. Control processor 210*a* may control the recording of television channels based on timers stored in DVR database 245. Control processor 210*a* may also provide commands to tuning management processor 210*b* when recording of a television channel is to cease. In addition to providing commands relating to the recording of television channels, control processor 210*a* may provide commands to tuning management processor 210*b* that indicate television channels to be output to decoder module 233 for output to a display device. Control processor 210*a* may also communicate with network interface 220 and remote control interface 250. Control processor 210*a* may handle incoming data from network interface 220 and remote control interface 250. Additionally, control processor 210*a* may be configured to output data via network interface 220.

Control processor 210*a* may include home automation engine 211. Home automation engine 211 may permit television receiver and control processor 210*a* to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210*b*. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, home automation settings database 247, and/or home automation script database 248. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Home automation settings database 247 may allow configuration settings of home automation devices and user preferences to be stored. Home automation settings database 247 may store data related to various devices that have been set up to communicate with television receiver 200. For instance, home automation settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 247 may store information that allows for the configuration and control of individual home automation devices which may operate using Z-wave and Zigbee-specific protocols. To do so, home automation engine 211 may create a proxy for each device that allows for settings for the device to be passed through a UI, e.g, presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 211, such as via device interface 221, may be configured at the electronic device 211 in addition to on the piece of exercise equipment itself. Additionally, a mobile device or application residing on a mobile device and utilized with exercise equipment may be configured in such a fashion as well for displaying received fitness information on a coupled display device.

Home automation script database 248 may store scripts that detail how home automation devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 150, a particular home automation script may be used to adjust home automation settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content. Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a CVM.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming. On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
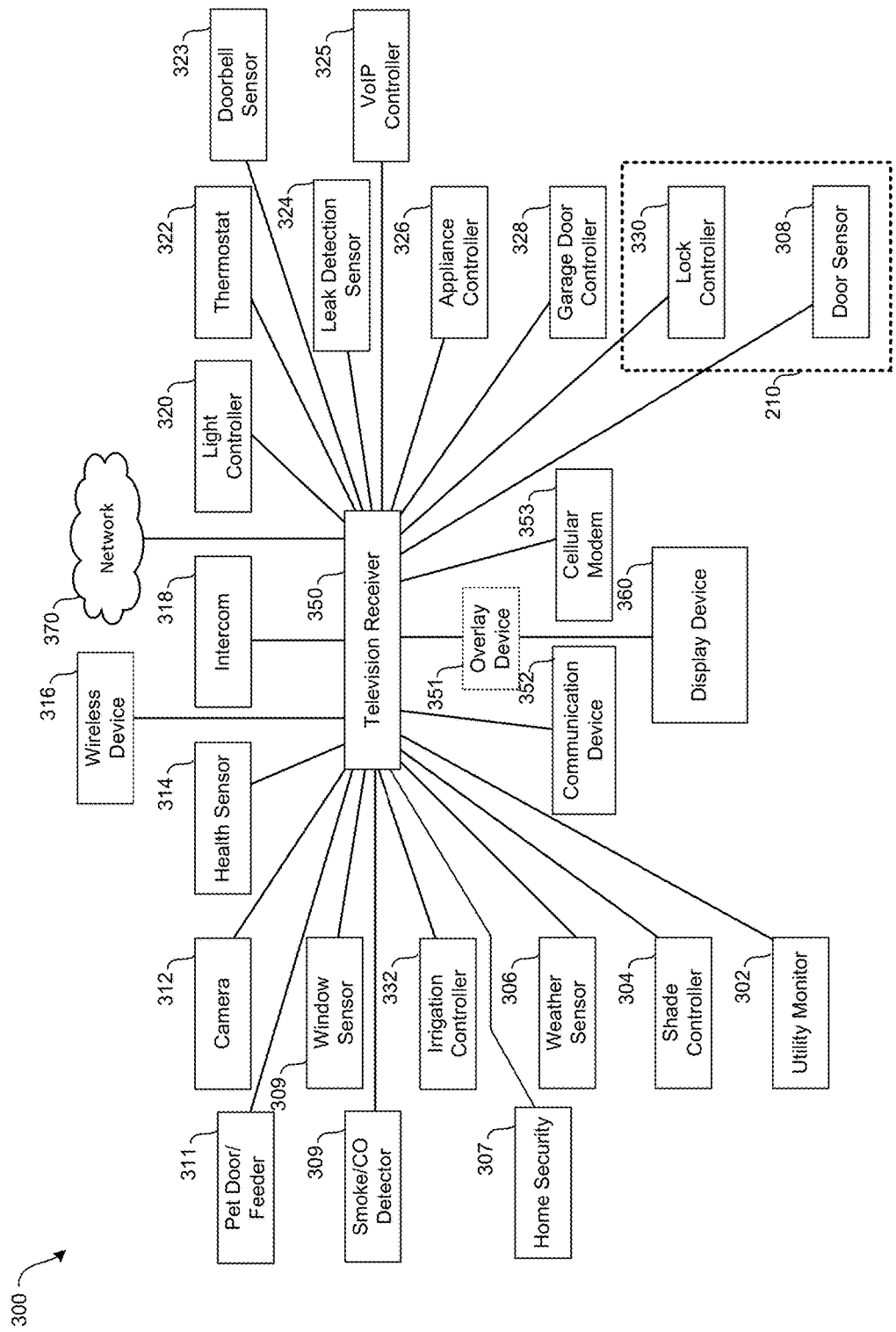
FIG. 3 illustrates an exemplary home automation system setup in accordance with embodiments of the present technology.

FIG. 3 illustrates an embodiment of a home automation system 300 hosted by a television receiver. Television receiver 350 may be configured to receive television programming from a satellite-based television service provider; in other embodiments other forms of television service provider networks may be used, such as an IP-based network (e.g., fiber network), a cable based network, a wireless broadcast-based network, etc.

Television receiver 350 may be configured to communicate with multiple in-home home automation devices. The devices with which television receiver 350 communicates may use different communication standards. For instance, one or more devices may use a ZigBee® communication protocol while one or more other devices communicate with the television receiver using a Z-Wave® communication protocol. Other forms of wireless communication may be used by devices and the television receiver. For instance, television receiver 350 and one or more devices may be configured to communicate using a wireless local area network, which may use a communication protocol such as IEEE 802.11.

In some embodiments, a separate device may be connected with television receiver 350 to enable communication with home automation devices. For instance, communication device 352 may be attached to television receiver 350. Communication device 352 may be in the form of a dongle. Communication device 352 may be configured to allow for Zigbee®, Z-Wave®, and/or other forms of wireless communication. The communication device may connect with television receiver 350 via a USB port or via some other type of (wired) communication port. Communication device 352 may be powered by the television receiver or may be separately coupled with a power source. In some embodiments, television receiver 350 may be enabled to communicate with a local wireless network and may use communication device 352 in order to communicate with devices that use a ZigBee® communication protocol, Z-Wave® communication protocol, and/or some other home wireless communication protocols.

Communication device 352 may also serve to allow additional components to be connected with television receiver 350. For instance, communication device 352 may include additional audio/video inputs (e.g., HDMI), a component, and/or a composite input to allow for additional devices (e.g., Blu-ray players) to be connected with television receiver 350. Such connection may allow video from such additional devices to be overlaid with home automation information. Whether home automation information is overlaid onto video may be triggered based on a user's press of a remote control button.

Regardless of whether television receiver 350 uses communication device 352 to communicate with home automation devices, television receiver 350 may be configured to output home automation information for presentation to a user via display device 360, which may be a television, monitor, or other form of device capable of presenting visual information. Such information may be presented simultaneously with television programming received by television receiver 350. Television receiver 350 may also, at a given time, output only television programming or only home automation information based on a user's preference. The user may be able to provide input to television receiver 350 to control the home automation system hosted by television receiver 350 or by overlay device 351, as detailed below.

In some embodiments, television receiver 350 may not be used as a host for a home automation system. Rather, a separate device may be coupled with television receiver 350 that allows for home automation information to be presented to a user via display device 360. This separate device may be coupled with television receiver 350. In some embodiments, the separate device is referred to as overlay device 351. Overlay device 351 may be configured to overlay information, such as home automation information, onto a signal to be visually presented via display device 360, such as a television. In some embodiments, overlay device 351 may be coupled between television receiver 350, which may be in the form of a set top box, and display device 360, which may be a television. In such embodiments, television receiver 350 may receive, decode, descramble, decrypt, store, and/or output television programming. Television receiver 350 may output a signal, such as in the form of an HDMI signal. Rather than be directly input to display device 360, the output of television receiver 350 may be input to overlay device 351. Overlay device 351 may receive the video and/or audio output from television receiver 350. Overlay device 351 may add additional information to the video and/or audio signal received from television receiver 350. The modified video and/or audio signal may be output to display device 360 for presentation. In some embodiments, overlay device 351 has an HDMI input and an HDMI output, with the HDMI output being connected to display device 360. To be clear, while FIG. 3 illustrates lines illustrating communication between television receiver 350 and various devices, it should be understood that such communication may exist, in addition or alternatively via communication device 352 and/or with overlay device 351.

In some embodiments, television receiver 350 may be used to provide home automation functionality but overlay device 351 may be used to present information via display device 360. It should be understood that the home automation functionality detailed herein in relation to a television receiver may alternatively be provided via overlay device 351. In some embodiments, overlay device 351 may provide home automation functionality and be used to present information via display device 360. Using overlay device 351 to present automation information via display device 360 may have additional benefits. For instance, multiple devices may provide input video to overlay device 351. For instance, television receiver 350 may provide television programming to overlay device 351, a DVD/Blu-Ray player may provide video overlay device 351, and a separate internet-TV device may stream other programming to overlay device 351. Regardless of the source of the video/audio, overlay device 351 may output video and/or audio that has been modified to include home automation information and output to display device 360. As such, in such embodiments, regardless of the source of video/audio, overlay device 351 may modify the audio/video to include home automation information and, possibly, solicit for user input. For instance, in some embodiments, overlay device 351 may have four video inputs (e.g., four HDMI inputs) and a single video output (e.g., an HDMI output). In other embodiments, such overlay functionality may be part of television receiver 350. As such, a separate device, such as a Blu-ray player, may be connected with a video input of television receiver 350, thus allowing television receiver 350 to overlay home automation information when content from the Blu-Ray player is being output to display device 360.

Regardless of whether television receiver 350 is itself configured to provide home automation functionality and output home automation input for display via display device 360 or such home automation functionality is provided via overlay device 351, home automation information may be presented by display device 360 while television programming is also being presented by display device 360. For instance, home automation information may be overlaid or may replace a portion of television programming (e.g., broadcast content, stored content, on-demand content, etc.) presented via display device 360.

Television receiver 350 or overlay device 351 may be configured to communicate with one or more wireless devices, such as wireless device 316. Wireless device 316 may represent a tablet computer, cellular phone, laptop computer, remote computer, or some other device through which a user may desire to control home automation settings and view home automation information. Such a device also need not be wireless, such as a desktop computer. Television receiver 350, communication device 352, or overlay device 351 may communicate directly with wireless device 316, or may use a local wireless network, such as network 370. Wireless device 316 may be remotely located and not connected with a same local wireless network. Via the internet, television receiver 350 or overlay device 351 may be configured to transmit a notification to wireless device 316 regarding home automation information. For instance, in some embodiments, a third-party notification server system, such as the notification server system operated by Apple®, may be used to send such notifications to wireless device 316.

In some embodiments, a location of wireless device 316 may be monitored. For instance, if wireless device 316 is a cellular phone, when its position indicates it has neared a door, the door may be unlocked. A user may be able to define which home automation functions are controlled based on a position of wireless device 316. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 350.

In some embodiments, little to no setup of network 370 may be necessary to permit television receiver 350 to stream data out to the Internet. For instance, television receiver 350 and network 370 may be configured, via a service such as Sling® or other video streaming service, to allow for video to be streamed from television receiver 350 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Wireless device 316 may serve as an input device for television receiver 350. For instance, wireless device 316 may be a tablet computer that allows text to be typed by a user and provided to television receiver 350. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While wireless device 316 may be used as the input device for typing text, television receiver 350 may output for display text to display device 360.

In some embodiments, a cellular modem 353 may be connected with either overlay device 351 or television receiver 350. Cellular modem 353 may be useful if a local wireless network is not available. For instance, cellular modem 353 may permit access to the internet and/or communication with a television service provider. Communication with a television service provider may also occur via a local wireless or wired network connected with the Internet. In some embodiments, information for home automation purposes may be transmitted by a television service provider system to television receiver 350 or overlay device 351 via the television service provider's distribution network.

Various home automation devices may be in communication with television receiver 350 or overlay device 351. Such home automation devices may use disparate communication protocols. Such home automation devices may communicate with television receiver 350 directly or via communication device 352. Such home automation devices may be controlled by a user and/or have a status viewed by a user via display device 360 and/or wireless device 316. Home automation devices may include: smoke/carbon monoxide detector, home security system 307, pet door/feeder 311, camera 312, window sensor 309, irrigation controller 332, weather sensor 306, shade controller 304, utility monitor 302, heath sensor 314, intercom 318, light controller 320, thermostat 322, leak detection sensor 324, appliance controller 326, garage door controller 328, doorbell sensor 323, and VoIP controller 325.

Door sensor 308 and lock controller 330 may be incorporated into a single device, such as a door lock or sensor unit, and may allow for a door's position (e.g., open or closed) to be determined and for a lock's state to be determined and changed. Door sensor 308 may transmit data to television receiver 350 (possibly via communication device 352) or overlay device 251 that indicates the status of a window or door, respectively. Such status may indicate open or closed. When a status change occurs, the user may be notified as such via wireless device 316 or display device 360. Further, a user may be able to view a status screen to view the status of one or more door sensors throughout the location. Window sensor 309 and/or door sensor 308 may have integrated glass break sensors to determine if glass has been broken. Lock controller 330 may permit a door to be locked and unlocked and/or monitored by a user via television receiver 350 or overlay device 351. No mechanical or electrical component may need to be integrated separately into a door or door frame to provide such functionality. Such a single device may have a single power source that allows for sensing of the lock position, sensing of the door position, and for engagement and disengagement of the lock.

Additional forms of sensors not illustrated in FIG. 3 may also be incorporated as part of a home automation system. For instance, a mailbox sensor may be attached to a mailbox to determine when mail is present and/or has been picked up. The ability to control one or more showers, baths, and/or faucets from television receiver 350 and/or wireless device 316 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 350 when within range. For instance, when a vehicle has been parked within range of a local wireless network with which television receiver 350 is connected, video and/or audio may be transmitted from the dashcam to the television receiver for storage and/or uploading to a remote server.

To be clear, the home automation functions detailed herein that are attributed to television receiver 350 may alternatively or additionally be incorporated into overlay device 351 or some separate computerized home automation host system.

Figure 4:
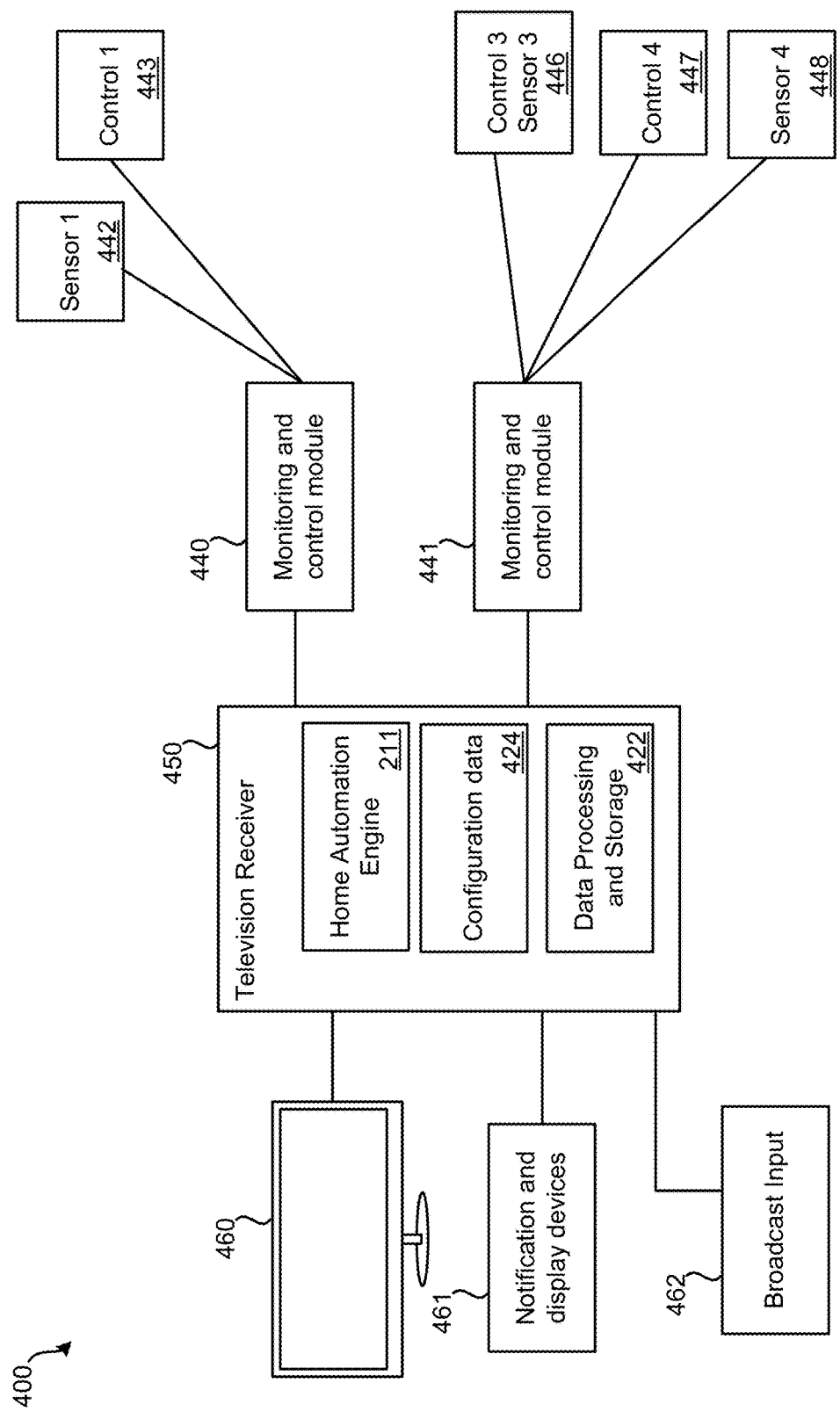
FIG. 4 illustrates an embodiment of a home automation system in accordance with embodiments of the present technology.

FIG. 4 shows an embodiment of a system for home monitoring and control that includes a television receiver 450. The system 400 may include a television receiver that is directly or indirectly coupled to one or more display devices 460 such as a television or a monitor. The television receiver may be communicatively coupled to other display and notification devices 461 such as stereo systems, speakers, lights, mobile phones, tablets, and the like. The television receiver may be configured to receive readings from one or more sensors 442, 448, or sensor systems 446 and may be configured to provide signals for controlling one or more control units 443, 447 or control systems 446.

In embodiments the television receiver may include a monitoring and control module 440, 441 and may be directly or indirectly connected or coupled to one or more sensors and/or control units. Sensors and control units may be wired or wirelessly coupled with the television receiver. The sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

The system may include one or more monitoring and control modules 440, 441 that are external to the television receiver 450. The television receiver may interface to sensors and control units via one or more of the monitoring and control modules. The external monitoring and control modules 440, 441 may be wired or wirelessly coupled with the television receiver. In some embodiments, the monitoring and control modules may connect to the television receiver via a communication port such as a USB port, serial port, and/or the like, or may connect to the television receiver via a wireless communication protocol such as Wi-Fi, Bluetooth, Z-Wave, ZigBee, and the like. The external monitoring and control modules may be a separate device that may be positioned near the television receiver or may be in a different location, remote from the television receiver.

In embodiments, the monitoring and control modules 440, 441 may provide protocol, communication, and interface support for each sensor and/or control unit of the system. The monitoring and control module may receive and transmit readings and provide a low level interface for controlling and/or monitoring the sensors and/or control units. The readings processed by the monitoring and control modules 440, 441 may be used by the other elements of the television receiver. For example, in some embodiments the readings from the monitoring and control modules may be logged and analyzed by the data processing and storage 422 module. The data processing and storage 422 module may analyze the received data and generate control signals, schedules, and/or sequences for controlling the control units. Additionally, the data processing and storage module 422 may utilize input data to generate additional outputs. For example, the module 422 may receive from a sensor 442 information from a communicatively coupled piece of equipment. The sensor may be a part of or attached to the equipment in various embodiments. The equipment may provide information regarding movements, alarms, or notifications associated with the home, and the data processing module 422 may use this data to generate relative distance information to be output to and displayed by display device 460. In some embodiments, the monitoring and control modules 440, 441 may be configured to receive and/or send digital signals and commands to the sensors and control units. The monitoring and control modules may be configured to receive and/or send analog signals and commands to the sensors and control units.

Sensors and control units may be wired or wirelessly coupled to the monitoring and control modules 440, 441 or directly or indirectly coupled with the receiver 450 itself. The sensors and control units may be coupled and connected in a serial, parallel, star, hierarchical, and/or the like topologies and may communicate to the monitoring and control modules via one or more serial, bus, or wireless protocols and technologies. The sensors may include any number of temperature, humidity, sound, proximity, field, electromagnetic, magnetic sensors, cameras, infrared detectors, motion sensors, pressure sensors, smoke sensors, fire sensors, water sensors, and/or the like. The sensors may also be part of or attached to other pieces of equipment, such as exercise equipment, doors or windows, or home appliances, or may be applications or other sensors as part of mobile devices.

The monitoring and control modules 440, 441 may be coupled with one or more control units. The control units may include any number of switches, solenoids, solid state devices and/or the like for making noise, turning on/off electronics, heating and cooling elements, controlling appliances, HVAC systems, lights, and/or the like. For example, a control unit may be a device that plugs into an electrical outlet of a home. Other devices, such as an appliance, may be plugged into the device. The device may be controlled remotely to enable or disable electricity to flow to the appliance. A control unit may also be part of an appliance, heating or cooling system, and/or other electric or electronic devices. In embodiments the control units of other system may be controlled via a communication or control interface of the system. For example, the water heater temperature setting may be configurable and/or controlled via a communication interface of the water heater or home furnace. Additionally, received telephone calls may be answered or pushed to voicemail in embodiments.

The controllers, e.g., controller 443, may include a remote control designed for association with the television receiver. For example, the receiver remote control device may be communicatively coupled with the television receiver, such as through interface 250, or one or more of the monitoring and control modules for providing control or instruction for operation of the various devices of the system. The control may be utilized to provide instructions to the receiver for providing various functions with the automation system including suspending alert notifications during an event. For example, a user may determine prior to or during an event that he wishes to suspend one or more types of notifications until the event has ended, and may so instruct the system with the controller.

Sensors may be part of other devices and/or systems. For example, sensors may be part of a mobile device such as a phone. The telemetry readings of the sensors may be accessed through a wireless communication interface such as a Bluetooth connection from the phone. As another example, temperature sensors may be part of a heating and ventilation system of a home. The readings of the sensors may be accessed via a communication interface of the heating and ventilation system. Sensors and/or control units may be combined into assemblies or units with multiple sensing capabilities and/or control capabilities. A single module may include, for example a temperature sensor and humidity sensor. Another module may include a light sensor and power or control unit and so on.

In embodiments, the sensors and control units may be configurable or adjustable. In some cases the sensors and control units may be configurable or adjustable for specific applications. The sensors and control units may be adjustable by mechanical or manual means. In some cases the sensors and control units may be electronically adjustable from commands or instructions sent to the sensors or control units. For example, the focal length of a camera may be configurable in some embodiments. The focal length of a camera may be dependent on the application of the camera.

In some embodiments the focal length may be manually set or adjusted by moving or rotating a lens. In some embodiments the focal length may be adjusted via commands that cause an actuator to move one or more lenses to change the focal length. In other embodiments, the sensitivity, response, position, spectrum and/or like of the sensors may be adjustable.

During operation of the system 400, readings from the sensors may be collected, stored, and/or analyzed in the television receiver 450. In embodiments, analysis of the sensors and control of the control units may be determined by configuration data 424 stored in the television receiver 450. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time based analysis to determine trends, such as temperature fluctuations in a typical day or energy usage. Such trending information may be developed by the receiver into charts or graphs for display to the user. For other applications, sensor analysis may include monitoring sensor readings to determine if a threshold value of one or more sensors has been reached.

The function of the system may be determined by loading and/or identifying configuration data for an application. In embodiments, the system 400 may be configured for more than one monitoring or control operation by selecting or loading the appropriate configuration data. In some embodiments the same sensors and/or control units may be used for multiple applications depending on the configuration data used to process and analyze sensor readings and/or activate the control units. Multiple monitoring and/or control applications may be active simultaneously or in a time multiplexed manner using the same or similar set of sensors and/or control units.

For example, the system 400 may be configured for both exercise monitoring and temperature monitoring applications using the same set of sensors. In embodiments, both monitoring applications may be active simultaneously or in a time multiplexed manner depending on which configuration data is loaded. In both monitoring applications the same sensors, such as proximity sensors, or cameras may be used. Using the same sensors, the system may be configured for space temperature monitoring. For temperature monitoring, the system may only monitor a specific subset of the sensors for activity. For temperature monitoring, sensor activity may not need to be saved or recorded. The sensor readings may be monitored for specific thresholds which may indicate a threshold temperature for adjusting the space temperature. In this example, the two different monitoring examples may be selected based on the active configuration data. When one configuration data is active, data from the sensors may be saved and analyzed. When the second configuration data is active, the system may monitor sensor readings for specific thresholds. Of course, multiple or alternative sensors may be used as well.

In embodiments the results, status, analysis, and configuration data details for each application may be communicated to a user. In embodiments auditory, visual, and tactile communication methods may be used. In some cases a display device such as a television may be used for display and audio purposes. The display device may show information related to the monitoring and control application. Statistics, status, configuration data, and other elements may be shown. Users may also save particular configuration data for devices, such as notification suspensions while the user is using the coupled display. A user may log in or be recognized by the system upon activation and the system may make adjustments based on predetermined or recorded configuration data. For example, a user may have instructed that when he is recognized by the system, either automatically or with provided login information, a notification suspension profile personal to the user be enacted. That profile may include that the user would like to continue to receive alarms, such as smoke, fire, or hazard alarms, but that received telephone call information is suspended. The user may access the profile and select to begin, the user may be recognized by the system, or a combination such as being recognized by the system such that the television operations are performed or are input by a remote control, while the user himself selects a particular activity to perform with the system.

Any number of additional adjustments or operations may be performed as well, as would be understood as encompassed by the present technology. For example, the space temperature may be monitored or adjusted as well. In one situation, after the user has been exercising for a period of time, generated heat may raise the space temperature above a threshold such that the home automation engine 211 additionally begins operation or adjustment of the HVAC system to cool the space. Additionally, configuration data for the user may include reducing the space temperature to a particular degree based on a preference of the user. Thus, when the user loads a profile or begins exercising, the home automation system may automatically begin adjusting the space temperature as well in anticipation of heat generation or user preferences.

In embodiments the system may include additional notification and display devices 461 capable of notifying the user, showing the status, configuration data, and/or the like. The additional notification and display devices may be devices that are directly or indirectly connected with the television receiver. In some embodiments computers, mobile devices, phones, tablets, and the like may receive information, notifications, control signals, etc., from the television receiver. Data related to the monitoring and control applications and activity may be transmitted to remote devices and displayed to a user. Such display devices may be used for presenting to the user interfaces that may be used to further configure or change configuration data for each application. An interface may include one or more options, selection tools, navigation tools for modifying the configuration data which in turn may change monitoring and/or control activity of an application. Modification to a configuration may be used to adjust general parameters of a monitoring application to specific constraints or characteristics of a home, user's schedule, control units, and/or the like.

Display interfaces may be used to select and/or download new configurations for monitoring and/or control applications. A catalog of pre-defined configuration data definitions for monitoring and control applications may be available to a user. A user may select, load, and/or install the applications on the television receiver by making a selection using in part the display device. For example, a user may load a profile based on notification suspension preferences as discussed above. In embodiments, configuration data may be a separate executable application, code, package, and/or the like. In some cases, the configuration data may be a set of parameters that define computations, schedules, or options for other processor executable code or instructions. Configuration data may be a meta data, text data, binary file, and/or the like.

In embodiments notification and display devices may be configured to receive periodic, scheduled, or continuous updates for one or more monitoring and control applications. The notifications may be configured to generate pop-up screens, notification banners, sounds, and/or other visual, auditory, and/or tactile alerts. In the case where the display device is a television, some notifications may be configured to cause a pop-up or banner to appear over the programming or content being displayed, such as when a proximity monitor has been triggered in the home. Such an alert may be presented in a centrally located box or in a position different from the fitness information to make it more recognizable. Additionally the program being watched can be paused automatically while such an alert is being presented, and may not be resumed unless receiving an input or acceptance from the user. Some notifications may be configured to cause the television to turn on if it is powered off or in stand-by mode and display relevant information for a user. In this way, users can be warned of activity occurring elsewhere in the system.

The television receiver may also be configured to receive broadcast or other input 462. Such input may include television channels or other information previously described that is used in conjunction with the monitoring system to produce customizable outputs. For example, a user may wish to watch a particular television channel while also receiving video information of activities occurring on the property. The television receiver may receive both the exterior camera information and television channel information to develop a modified output for display. The display may include a split screen in some way, a banner, an overlay, etc.

Figure 5:
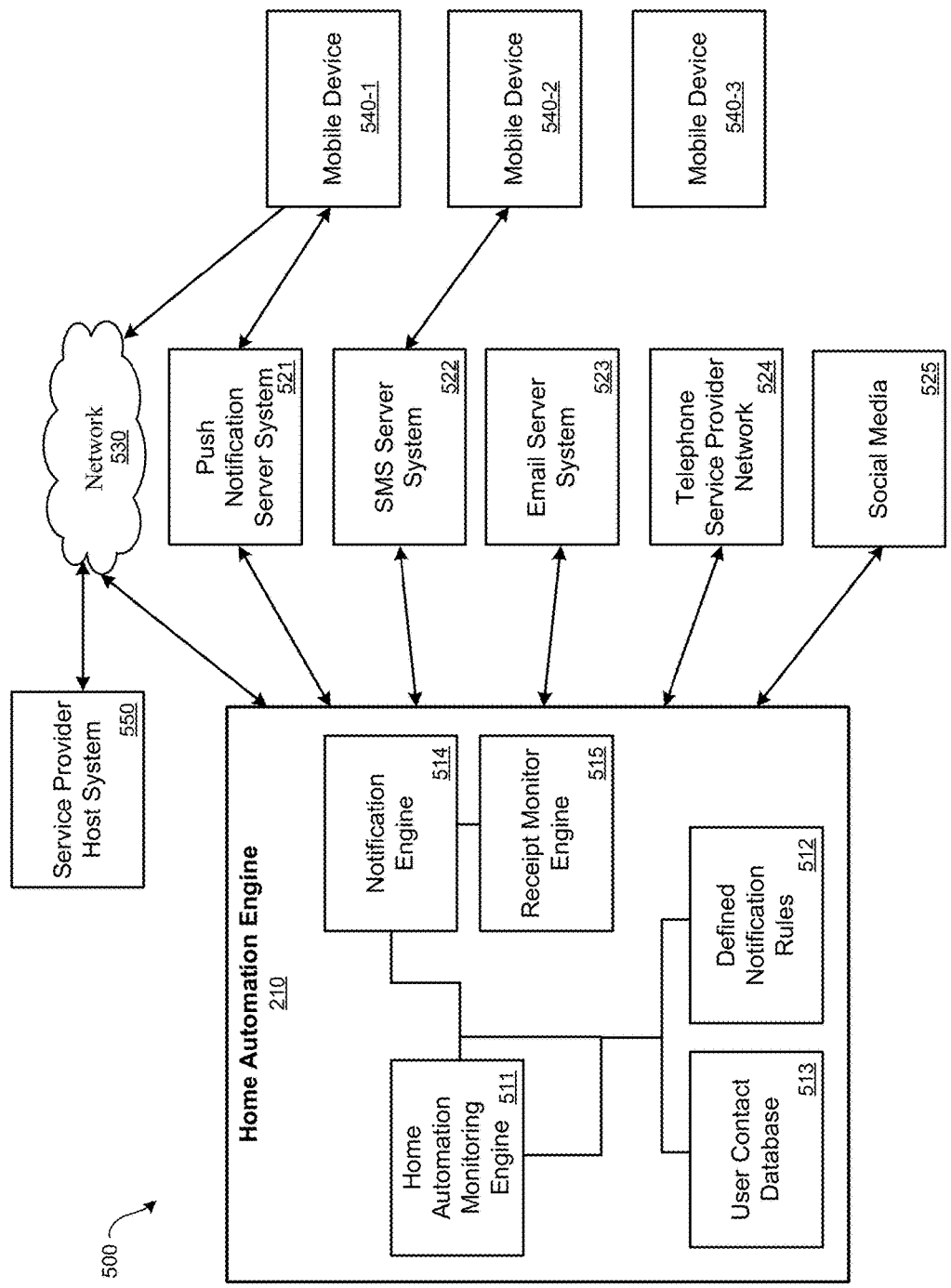
FIG. 5 illustrates an embodiment of a home automation engine using various communication paths to communicate with one or more mobile devices in accordance with embodiments of the present technology.

FIG. 5 illustrates an embodiment 500 of a home automation engine using various communication paths to communicate with one or more mobile devices. Embodiment 500 may include: home automation engine 210, push notification server system 521, SMS server system 522, email server system 523, telephone service provider network 524, social media 525, network 530, and mobile devices 540 (540-1, 540-2, 540-3).

Home automation engine 210 may represent hardware, firmware, and/or software that are incorporated as part of the home automation host system, such as television receiver 350, communication device 352, or overlay device 351 of FIG. 3. Home automation engine 210 may include multiple components, which may be implemented using hardware, firmware, and/or software executed by underlying computerized hardware. Home automation engine 210 may include: home automation monitoring engine 511, defined notification rules 512, user contact database 513, notification engine 514, and receipt monitor engine 515.

Home automation monitoring engine 511 may be configured to monitor various home automation devices for events, status updates, and/or other occurrences. Home automation monitoring engine 511 may monitor information that is pushed to home automation engine 210 from various home automation devices. Home automation monitoring engine 511 may additionally or alternatively query various home automation devices for information. Defined notification rules 512 may represent a storage arrangement of rules that were configured by a user. Such defined notification rules may indicate various states, events, and/or other occurrences on which the user desires notifications to be sent to one or more users. Defined notification rules 512, which may be stored using one or more non-transitory computer readable mediums, may allow a user to define or select a particular home automation device, an event or state of the device, a user or group of users, and/or classification of the home automation state or event. For example, Table 1 presents three examples of defined notification rules which may be stored as part of defined notification rules 512. In some embodiments, it may be possible that the service provider provides home automation engine 210 with one or more default defined home automation notification rules. A user may enable or disable such default defined notification rules and/or may be permitted to create customized notification rules for storage among defined notification rules 512. A user may be permitted to enable and disable such defined notification rules as desired.

TABLE 1

| Rule Name | Home Automation Device | Rule Trigger | Action | Classification | First group of users to notify | Second (fallback) group of users to notify |
|---|---|---|---|---|---|---|
| "Person at Door" | Doorbell Sensor | Doorbell actuation event | Send Notification [Text of Notification] [Coded Notification] | Class 1 | Defined community 1 | Default |
| "Window Open?" | Window Sensor | ]Window state] = open | Send Notification [Text of Notification] [Coded Notification] | Class 2 | Custom: Thomas, Jeff, Jason, Andrew | None |
| "Door Left Ajar" | Door Sensor | [Door state] = open > 30 seconds | Send Notification [Text of Notification] [Coded Notification] | Urgent | Defined communities 1 and 3 | Defined Community 4 |

In Table 1, a user (or service provider) has defined a rule name, the relevant home automation device, the trigger that causes the rule to be invoked, the action to be performed in response to the rule being triggered, the classification of the rule, a first group of users to send the notification, and a second group of users to notify if communication with the first group of users fails. To create a rule, home automation engine 210 may output a user interface that walks a user through creation of the rule such as by presenting the user with various selections. As an example, a user may first type in a name for rule. Next, the user may be presented with a list of home automation devices that are present in the home automation network with which home automation engine 210 is in communication. The user may then be permitted to select among triggers that are applicable to the selected home automation device, such as events and states that can occur at the selected home automation device. For instance, home automation devices such as a doorbell sensor may only have a single possible event: a doorbell actuation. However, in other home automation devices, such as garage door controller 128 may have multiple states, such as open, shut, and ajar. Another possible state or event may be a low battery state or event. Next, the user may select the action that the home automation engine is to perform in response to the trigger event for the home automation device occurring. For the three examples of Table 1, notifications are to be sent to various groups (called "communities") of users.

In some embodiments, a user may be permitted to select a classification for each rule. The classification may designate the urgency of the rule. Depending on the classification, the communication channels tried for communication with the user and/or the amount of time for which home automation engine 210 waits for a response before trying another communication channel may be controlled. The user may also define one or more groups of users that are to receive the notifications. The first group of users may include one or more users and may indicate which users are to initially receive a notification. The second group of users may remain undefined for a particular rule or may specify one or more users that are to receive the notification if the notification failed to be received by one, more than one, or all users indicated as part of the first group of users.

If a particular grouping of users is to collectively receive notifications, a user may be permitted to define a "community" rather than specifying each user individually. For instance, a user may select from among available users to create "defined community 1," which may include users such as: "Thomas," "Nick," and "Mary." By specifying "defined community 1" the user may not have to individually select these three users in association with the rule. Such a use of defined communities is exemplified in Table 1.

User contact database 513 may specify definitions of groups of users and orderings of communication paths for individual users and/or classifications. Table 2 presents an exemplary embodiment of an ordering of communication paths for particular user.

TABLE 2

| User Name | First Communication Path | Second Communication Path | Third Communication Path | Fourth Communication Path |
|---|---|---|---|---|
| Andrew | Push Notification | SMS Text Message | Email (Fail) | Social Media Post (Fail) |
| Jeff | SMS Text Message | Push Notification | Voice call | Email (fail) |
| Jason | Push Notification | SMS Text | Email (Fail) | — |
| Thomas | SMS Text | Voice Call | — | — |

For each user, one or more communication paths are defined. For example, for the user named Andrew, the first communication path is a push notification. His second communication Path is an SMS text message. The SMS text message may be used as the communication path if a receipt response is not received in response to transmission of a push notification within a defined period of time. Similarly, if the second communication path fails to yield a receipt being received by receipt monitor engine 515 after a pre-defined period of time, an email, which is Andrew's third communication path, may be used to send the notification. Entries in Table 2 labeled as "Fail" may be indicative of a communication path that may receive the notification but from which a receipt is not expected and is treated as a failed communication attempt. For instance, an email sent to an email address associated with Andrew may go through and may be accessible by Andrew the next time he accesses his email account; however, notification engine 514 may send the notification via the fourth communication path without waiting a defined period of time since a receipt is not expected to be received in response to the email. For different users, different communication paths may be ordered differently. For instance, an SMS text message is defined as Jeff's first communication path while an SMS text message is defined as Andrew's second communication path. Each user via an application on his or her mobile device, or by directly interacting with the home automation host system executing home automation engine 210, may customize which communication paths are used for their notifications and the ordering of such communication paths.

For each type of communication path, a default period of time to wait for a receipt response may be defined. For instance, for push notifications, a default wait period of time may be one minute, while the default wait period of time for an SMS text message may be two minutes. Such wait periods of time may be tied to the classification of the rule. For instance, a classification of urgent may cause the period of time to be halved. In some embodiments, a user can customize his wait periods of time. For users, various alternate orderings of communication paths may be created based on the classification of the rule and/or whether the user is part of the first group of users or the second, fallback group of users.

When home automation monitoring engine 511 determines that a rule of defined notification rules 512 has been triggered, notification engine 514, by accessing user contact database 513, may begin transmitting one or more notifications to one or more users using one or more communication paths. Notification engine 514 may be configured to try communicating with the user via a first communication path, then waiting a defined period of time to determine if a receipt is received in response notification. If not, notification engine 514 may use user contact database 513 to determine the next communication path for use in communicating with the user. Notification engine 514 may then use such a communication path to try to communicate with the user. Notification engine 514 may determine when communication with a particular user has failed and, if available, a second group of users, which can be referred to as a fallback group of users, should receive a notification instead. In such an instance, notification engine 514 may then use user contact database 513 in order to communicate with the second group of users via the ordering of defined communication paths.

While notification engine 514 may cause notifications to be transmitted to users via various communication paths, receipt monitor engine 515 may monitor for received receipts that are indicative of delivery of the notification. Receipt monitor engine 515 may inform notification engine 514 when a notification has been received and further notifications to that user are unnecessary. Receipt monitor engine 515 may cause information to be stored by home automation engine 210 indicative of the circumstances under which the notification was received. For instance, receipt monitor engine 515 may create a database entry that is indicative of the user, the time of receipt (or of viewing by the user), and the communication path that was successful in causing the notification to reach the user.

Illustrated in embodiment 500 are various communication paths that may be used by notification engine 514 for communicating with various users' mobile devices. These communication paths include: push notification server system 521, SMS server system 522, email server system 523, telephone service provider network 524, social media 525, and network 530. Push notification server system 521 may be a system that causes a mobile device to display a message such that the message must be actively dismissed by the user prior to or otherwise interacting with the mobile device. As such, a push notification has a high likelihood of being viewed by user since the user is required to dismiss the push notification before performing any other functions, home automation related or not, with the mobile device.

SMS server system 522 may cause text messages to be sent to mobile devices. Typically, a mobile device provides an alert, such as a sound of flashing light or vibration to user to indicate that a new text message has been received. However, it is possible for a user to interact with a mobile device that has received a new SMS text message without viewing or otherwise interacting with the text message. Other forms of messaging systems may additionally or alternatively be used, such as Apple's iMessage service. Email server system 523 may serve as an email service provider for user. An email transmitted to a user, that is sent to email server system 523 may be viewed by the user the next time the user accesses email server system 523. In some embodiments, emails are actively pushed by email server system 523 to an application being executed by a user's mobile device, thus increasing the likelihood that a user will look at the email shortly after it has been sent. In other embodiments, a user's mobile device may be required to be triggered by the user to retrieve emails from email server system 523, such as by executing an application associated with the email server system or by logging in to the user's email account via a web browser being executed by the mobile device.

Telephone service provider network 524 may permit voice calls to be performed to a mobile device. A user operating such a mobile device may answer a telephone call to hear a recorded message that is transmitted by notification engine 514 or, if the user does not answer, a voicemail may be left for the user using telephone service provider network 524. Social media 525 may represent various social media networks through which notification engine 514 can try to communicate with the user. Social media may for example include: Twitter®, Facebook®, Tumblr®, LinkedIn®, and/or various other social networking websites. Notification engine 514 may directly transmit a message to a user via social media 525 (e.g., Facebook® Messenger) or may create a post to one or more social media websites via a shared or dedicated social media account that could be viewed by the user. For example, notification engine 514 may have login credentials to a Twitter® account that can be used to post a message indicative of the home automation notification. If the user is following the Twitter® account associated with the notification engine, the notification would be listed in the user's Twitter® feed. If such posts are public (that is, available to be viewed by members of the public, such as on Twitter®), the social media post may be "coded" such that it would only make sense to the user. A user, by configuring an alternate notification text at home automation engine 210 (as indicated in Table 1) may assign coded words or phrases to various home automation events that would be posted to public social media. For instance the door being left ajar may be assigned: "The cat is out of the bag" is a coded message to be posted to social media, while a direct message (e.g., SMS text message) would not be coded, such as: "Your home's front door is ajar." While to a member of the public, a coded notification may be nonsensical, to the user who configured the notification, the coded notification may be quickly interpreted as meaning his home's front door has been left ajar.

Network 530 may represent one or more public and/or private networks through which notification engine 514 and receipt monitor engine 515 may communicate with a mobile device. For instance network 530 may represent a home wireless network, such as network 170, and/or the Internet. For instance, if notification engine 514 has an IP address of mobile device 540-1, it may be possible for notification engine 514 to directly transmit a notification via network 530 to mobile device 540-1. Additionally or alternatively, mobile device 540-1 may be executing an application that can communicate directly with home automation engine 210 via network 530. Home automation engine 210 and a mobile device may alternatively or additionally communicate with service provider host system 550, which is accessible via network 530, and serves as an intermediary for communications between home automation engine 210 and mobile device. For instance, a message to be transmitted from mobile device 540-1 to home automation engine 210 may be transmitted by mobile device 540-1 to service provider host system 550 via network 530. Home automation engine 210 may periodically query service provider host system 550 via network 530 to determine if any messages are pending for home automation engine 210. In response to such a query, the message transmitted by mobile device 540-1 destined for home automation engine 210 may be retrieved by home automation engine 210.

Three mobile devices are illustrated in embodiment 500. Each of such mobile devices may be associated with a different user. In embodiment 500, such mobile devices are shown as only being available via specific communication paths. This is for example purposes only. For instance, mobile device 540-1 can communicate with home automation engine 210 via push notification server system 521 (which may be unidirectional to mobile device 540-1), and network 530 (such as via communications coordinated by service provider host system 550). Mobile device 540-2 may, for some reason, be unable to receive push notifications sent via push notification server system 521 but may be able to send and receive SMS texts via SMS server system 522. Mobile device 540-3 may be currently unavailable via any of the illustrated communication paths. For example, based on where mobile device 540-3 is located, it may be unable to communicate with a wireless network that enables access to one or more of the communication paths illustrated in FIG. 5 or the mobile device may be turned off.

It should be understood that the communication paths, components of home automation engine 210, and the number of mobile devices 540 are intended to represent examples. For instance, notifications may be sent to types of devices other than mobile devices. For instance, for a user, while the first notification may be sent to the user's mobile device, a second communication path may communicate with the user's desktop computer. Further various components of home automation engine 210 may be divided out into a greater number of components or may be combined into fewer components.

Figure 6:
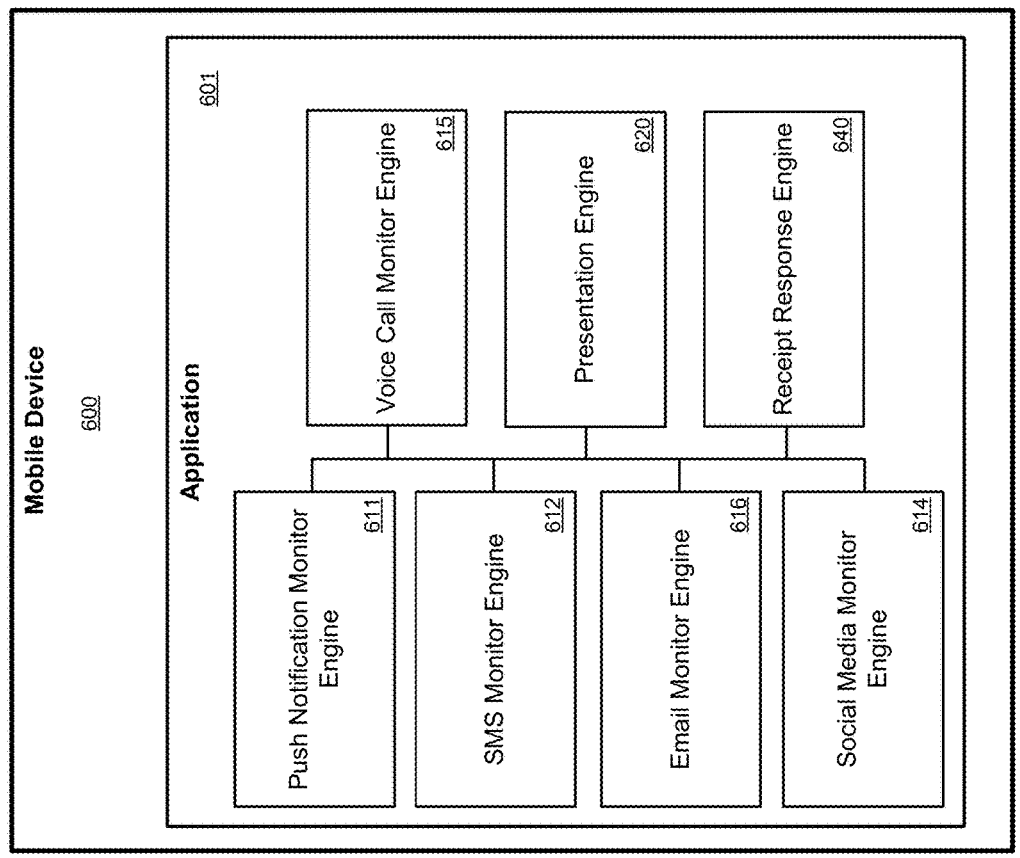
FIG. 6 illustrates an embodiment of a mobile device executing an application that monitors various communication paths in accordance with embodiments of the present technology.

FIG. 6 illustrates an embodiment of a mobile device 600 executing an application that monitors various communication paths. Mobile device 600 may represent each of mobile devices 540 or some other form of mobile device that is receiving notifications from a home automation engine via various possible communication paths. Mobile device 600, which may be a cellular phone, smart phone, smart television, smart watch, smart glasses, table computer, laptop, in-dash network-enabled navigation system, or other form of a wireless and/or mobile computerized device, may execute application 601. Application 601 may be executed in the background such that when a user is not interacting with application 601, a process of application 601 can monitor various communication paths of mobile device 600. A user may also bring application 601 to the foreground, such that the user can view a user interface of application 601 and generally interact with application 601. Application 601 may include: push notification monitor engine 611, SMS monitor engine 612, email monitor engine 613, social media monitor engine 614, presentation engine 620, and receipt response engine 640. Such modules may be implemented using software that is executed on underlying hardware.

Push notification monitor engine 611 may monitor for when a push notification is received by mobile device 600 that includes a notification from notification engine 514 of home automation engine 210. The operating system of mobile device 600 may cause the push notification to be presented by a display of mobile device 600 such that a user is required to view and dismiss the push notification before performing any other function on mobile device 600. The push notification, when displayed, may present text of the push notification indicative of the home automation event. For instance, returning to Table 1 for the "Person at Door" event, the corresponding [Text of Notification] from the event may be presented as part of the push notification. Additional information may include the time at which the event occurred and a location of the home automation engine (which may be useful if the user has home automation systems installed at multiple locations, such as a primary home, office building, and vacation home). Push notification monitor engine 611 may determine 1) that the push notification has been received by mobile device 600; and 2) if the user has dismissed the push notification. SMS monitor engine 612 may monitor for when a text message is received by mobile device 600 that includes a notification from notification engine 514 of home automation engine 210. SMS monitor engine 612 may monitor for a particular string of characters that is indicative of the home automation engine 210 or the source number from which the SMS text message may be indicative of the home automation engine. The operating system of mobile device 600 may cause the text message to be stored and may cause the mobile device 600 to output vibration, sound, and/or light indicative of the received text message. The user may need to select the text message for presentation or the text message may be automatically displayed by mobile device 600. The text of the SMS message may present text indicative of the home automation event. For instance, as with the push message, returning to Table 1 for the "Person at Door" event, the corresponding [Text of Notification] from the event may be presented as part of the SMS message. Additional information may include the time at which the event occurred and a location of the home automation engine. SMS monitor engine 612 may determine 1) that the SMS message containing the notification has been received by mobile device 600; and 2) if the user has viewed the SMS text containing the notification.

Email monitor engine 613 may monitor for when an email is received by mobile device 600 that includes a notification from notification engine 514 of home automation engine 210. Email monitor engine 613 may monitor for a particular string of characters in either the body or subject line of the email that is indicative of the home automation engine 210 or the sender from which the email was received may be indicative of the home automation engine. The email may be added to an inbox of mobile device 600 and an operating system of mobile device 600 may cause vibration, sound, and/or light to be output that is indicative of the received email. The user may need to select an email application and the email for the email to be presented by mobile device 600. The text of the email may present text indicative of the home automation event. For instance, as with the push message and the SMS text message, returning to Table 1 for the "Person at Door" event, the corresponding [Text of Notification] from the event may be presented as part of the SMS message. Additional information may include the time at which the event occurred and a location of the home automation engine. Since an email can contain significantly more information than an SMS text or push notification, more details regarding the home automation event and system may be presented as part of the email. Email monitor engine 613 may determine 1) that the email message containing the notification has been received by mobile device 600; and 2) if the user has opened the email containing the notification.

Social media monitor engine 614 may monitor for when a social media post is made by home automation engine 210 that is indicative of a notification. As such, social media monitor engine 614 may periodically check one or more social media feeds for posts either privately sent to a user of mobile device 600 or publically posted. Social media monitor engine 614 may monitor for a particular string of characters that is indicative of the home automation engine 210 or the username or account from which the post was made which is indicative of the home automation engine. The text of the social media post may present text indicative of the home automation event. For instance, as with the push message, returning to Table 1 for the "Person at Door" event, the corresponding [Text of Notification] from the event may be presented as part of the social media post. If the post is made publically, a code message may be posted instead of the [Text of Notification]. For instance, referring to Table 1, [Coded Notification] may be publically posted instead of [Text of Notification]. Additional information posted may include the time at which the event occurred and a location of the home automation engine. Social media monitor engine 614 may determine 1) mobile device 600 has received the social media post (e.g., in an updated Twitter® feed); and 2) if the user has viewed the social media message containing the notification or the social media feed containing the notification.

Voice call monitor engine 615 may monitor for when a voice call or voicemail is received by mobile device 600 that includes a notification from notification engine 514 of home automation engine 210. Voice call monitor engine 615 may monitor for a particular phone number from which the call is originating to determine that a notification from the home automation engine has been received. The operating system of mobile device 600 may cause an indication of the voice message to be presented via output vibration, sound, and/or light. The user may need to answer the call or listen to the voicemail in order to receive the notification. Voice call monitor engine 615 may determine 1) whether the notification has been received; and 2) if the user has listened to the voicemail or answered the call. The voice call or voicemail may include synthesized voice that reads the notification for the home automation event. Additional information may include the time at which the event occurred and a location of the home automation engine.

In some embodiments, it may not be possible to monitor various communication paths. For instance, a user may have his email only accessible via a specialized application (e.g., Google's® Gmail™ application). As such, the user may receive the email; however, email monitor engine 613 may not be able to determine that the email has been received. During an initial configuration, home automation engine 210 may test communication paths with application 601 when it is known or expected that such communication paths are functional. Such a test may determine which communication paths of application 601 will be able to acknowledge receipt of notifications. When a notification cannot be acknowledged, notification engine 514 may still use such a communication path to send a notification but may assume transmission has failed and/or may only use such a communication path as a final attempt. For instance, such communication paths are noted in Table 2 with the "(fail)" designation.

A user may view the push notifications, SMS texts, emails, social media posts and/or messages, and (listen to) voice calls directly. Additionally, when one of the monitor engines (611-615) notes that a notification has been received, presentation engine 620 may be triggered to present an additional or alternate indication of the notification. For instance, if the user launches application 601 (such that it is displayed and no longer only executed in the background of mobile device 600), presentation engine 620 may cause information regarding the notification to be presented in a user friendly format and may allow the user to perform various actions in response to the notification. For instance, if the notification is "Door left ajar," the user may have the ability to select from "View security camera feed," "Call at-home User" (which may determine, such as based on geo-positioning, a user who is within the home) and "Call 911."

Receipt response engine 640 may receive information from engines 611-615 that is indicative of a notification being received and/or of the notification being viewed, dismissed, or heard by the user. Receipt response engine 640 may generate and cause a response to be transmitted by mobile device 600 to receipt monitor engine 515 of home automation engine 211. The receipt response may indicate the time at which the notification was received and/or viewed/heard by the user.

Figure 7:
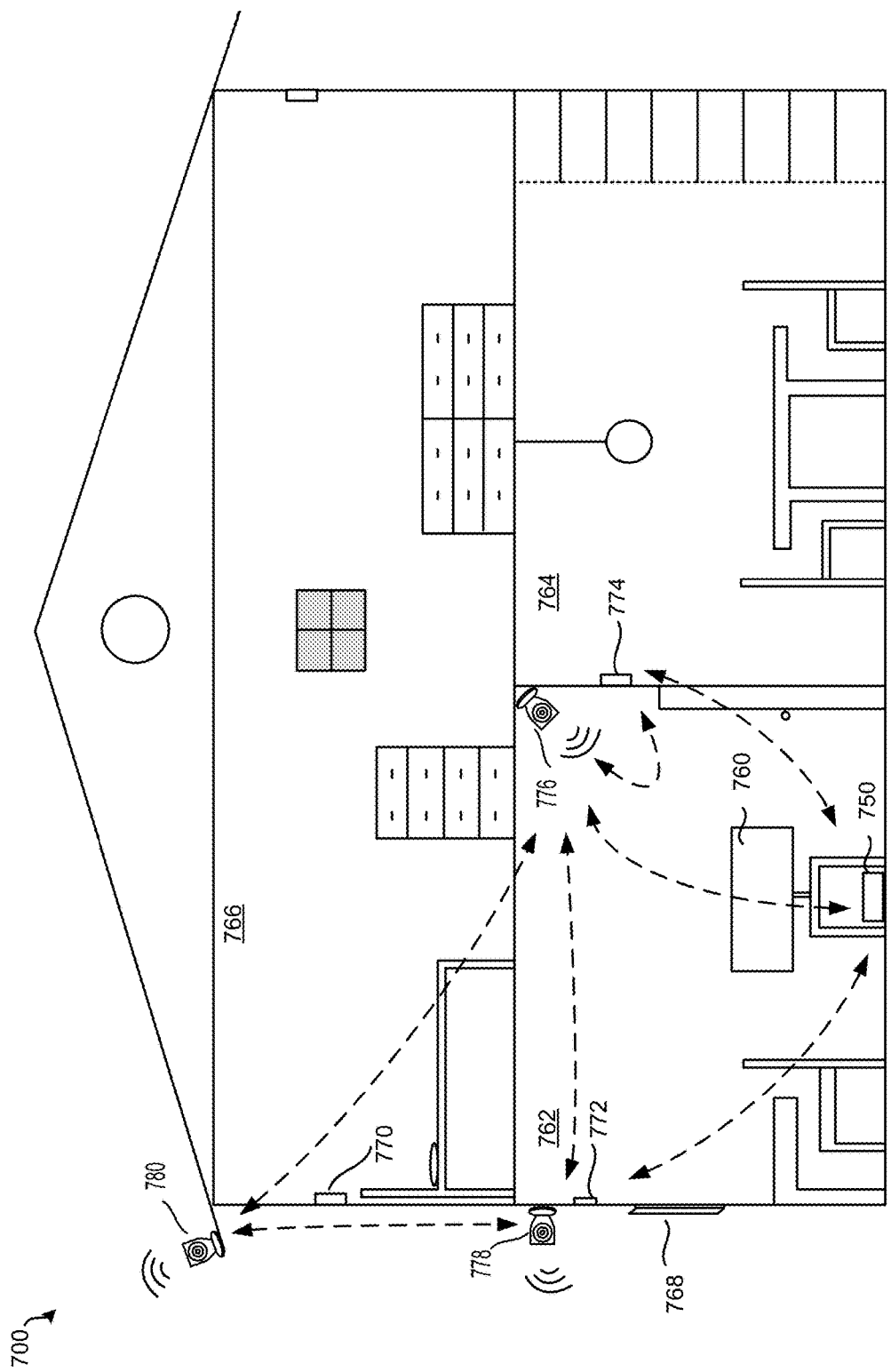
FIG. 7 illustrates a structure that includes a dwelling and a home automation system connected to the dwelling, according to embodiments of the present technology.

FIG. 7 illustrates a structure 700 that includes a dwelling and a home automation system connected to the dwelling, according to embodiments of the present technology. The structure 700 includes three different rooms 762, 764 and 766. As shown in FIG. 7, room 766 is a bedroom, room 762 is a living room, and room 764 is a dining room. Included in the structure 700 is a home automation system and/or home security system. The home automation system may include home automation devices. The home automation system (such as the home automation devices) may include various devices (e.g. sensors or sensors within other home automation devices) that may be distributed around the structure, such as, for example, sensors 770, 772, 774, 776, 778, and 780. Sensors 770, 772, 774, 776, 778, and 780 may be, for example, motion detectors, video cameras, temperature sensors that record temperature readings of the current temperature of the room that the sensor is located in, among others. Sensors 770, 772, 774, 776, 778, and 780 may compile recordings of data over a period of time. The recordings may be stored locally at each sensor, or may be transmitted from the different sensors to a central location, such as to a television receiver (e.g. a television receiver 750 that is connected to television display 760) or other home automation processing unit for storage. Although sensors 770, 772, 774, 776, 778, and 780 or other sensors may be discussed herein as being a part of a home automation system, such sensors may also be a part of a home security system, either connected to the home security system or otherwise.

In a more specific example, sensors 776, 778 and 780 may be video cameras as shown in FIG. 7. Video camera 776 may view portions of room 762 and collect data regarding the environment in room 762. Video camera 776 may also view and record portions of the environment outside of room 762, such as outside structure 700 altogether. For example, video camera 776 may view the environment outside structure 700 through window 768. Similarly, video cameras 778 and 780 are located outside of, but attached to, structure 700, and may view and record portions of the environment outside of structure 700. Video cameras 776, 778 and 780, or a device connected to one or more of the video cameras, may include certain hardware or software that allows the home security system to determine what types of objects, or people, that the video camera sees. For example, the home automation system may include facial recognition software, or other recognition software, to determine when a certain user (or unwanted non-user), is present inside or outside the structure 700. In another example, the video cameras may be configured to detect certain characteristics about a person or object inside or outside of structure 700, including physical characteristics regarding the person or object's physical characteristics (e.g. facial structure, facial features, skin color, hair style and/or color, etc.), position, actions, non-action, among other characteristics. Using the home automation system and television receiver, such as television receiver 750, a user may be able to control, based on user initiated settings, how the security system devices and home automation devices function and how they can be tailored to the user, such as how the home automation system sensors detect people or objects it views and how it uses characteristics about those people or objects. For example, a video camera sensor of the home automation system may detect a suspicious person of interest (e.g. a person nearby or in close proximity to a home), a dangerous object such as a weapon, or other people or objects.

Home automation sensors 770, 772 and 774 may be any of a variety of other types of home automation sensors. Sensors 770, 772 and 774 may be the same type of devices, or may be different device from one another. For example, sensors 770, 772 and 774 may include a microphone that is configured to detect or receive audio signals coming from inside or outside of structure 700. For example, sensors 770 and/or 772 may detect audio signals coming from a person, car, or other object outside structure 700. In a more specific example, sensors 770 and/or 772 may detect audio coming from the voice of a person near structure 700, where the person may be a threat to the structure or the users of the home automation system living inside the structure.

Although the home automation system, security system, or other similar system may be described using various different features or types of sensors, such sensors may overlap both systems, may be present in either system, or may be a part of both systems. Furthermore, the home automation system and home security system may share data collected for use by the other corresponding system to make determinations for its own purposes.

Within the home automation system, devices (e.g. sensors 770, 772, 774, 776, 778, and 780) may communicate with each other via various communication paths, as shown in FIG. 7. The home automation devices may communicate with each other directly (i.e. device to device) or may communicate with each other via a central control device. For example, such a central control device may be television receiver 750. Therefore, home automation devices may route their communications directed to other home automation devices through television receiver 750. Furthermore, television receiver 750 may communicate with each of the home automation devices in the home automation system, either directly with each home automation device, or through other home automation devices.

Sensors 770, 772, 774, 776, 778, and 780 may collect data from their environment. For example, sensors 770, 772, 774, 776, 778, and 780 may collect audio, video, or other signals from inside the structure 700, such as actions, sounds or other data associated with one or more users of the home automation system inside the structure. In another example, sensors 770, 772, 774, 776, 778, and 780 may collect audio, video, or other signals and data from those signals from outside structure 700. Data collected from outside structure 700 may include signals or data generated from people or objects near or in the vicinity of the structure, such as people or cars on a street near the structure, or similar data. After sensors 770, 772, 774, 776, 778, and 780 have collected data from their environments, sensors 770, 772, 774, 776, 778, and 780 may transmit that data to the other sensors in the home automation system. Furthermore, sensors 770, 772, 774, 776, 778, and 780 may transmit that data to a central device, such as television receiver 750. The data received at television receiver 750 may be displayed on display 760, or may be transmitted to a mobile or other remote device for viewing by a user of the home automation system at a location away from the structure 700.

Data other than data captured by home automation or home security sensors may also be collected and/or used by the television receiver and/or home automation system. For example, a user may manually upload data captured by the user. For example, the user may capture picture(s), video, audio, etc. of a person of interest captured in real time, and the user may upload that data to the system for use and analysis. The user may also be able to add additional data or description about the person, object, or action of interest associated with the data captured. For example, the user may be able to select certain tags or other data associations that apply to each piece of data captured and uploaded. Such tags or associations may be subjective, and may not be able to be captured separately by, for example, a home automation sensor. In one example, the user may be able to associate the data captured with other data previously uploaded or captured by a home automation sensor. In a more specific example, a user may associate certain data with a certain person of interest that the user recently saw in the neighborhood. The user may be able to add context to the data that may not otherwise be captured by home automation devices, such as video cameras or microphones.

Figure 8:
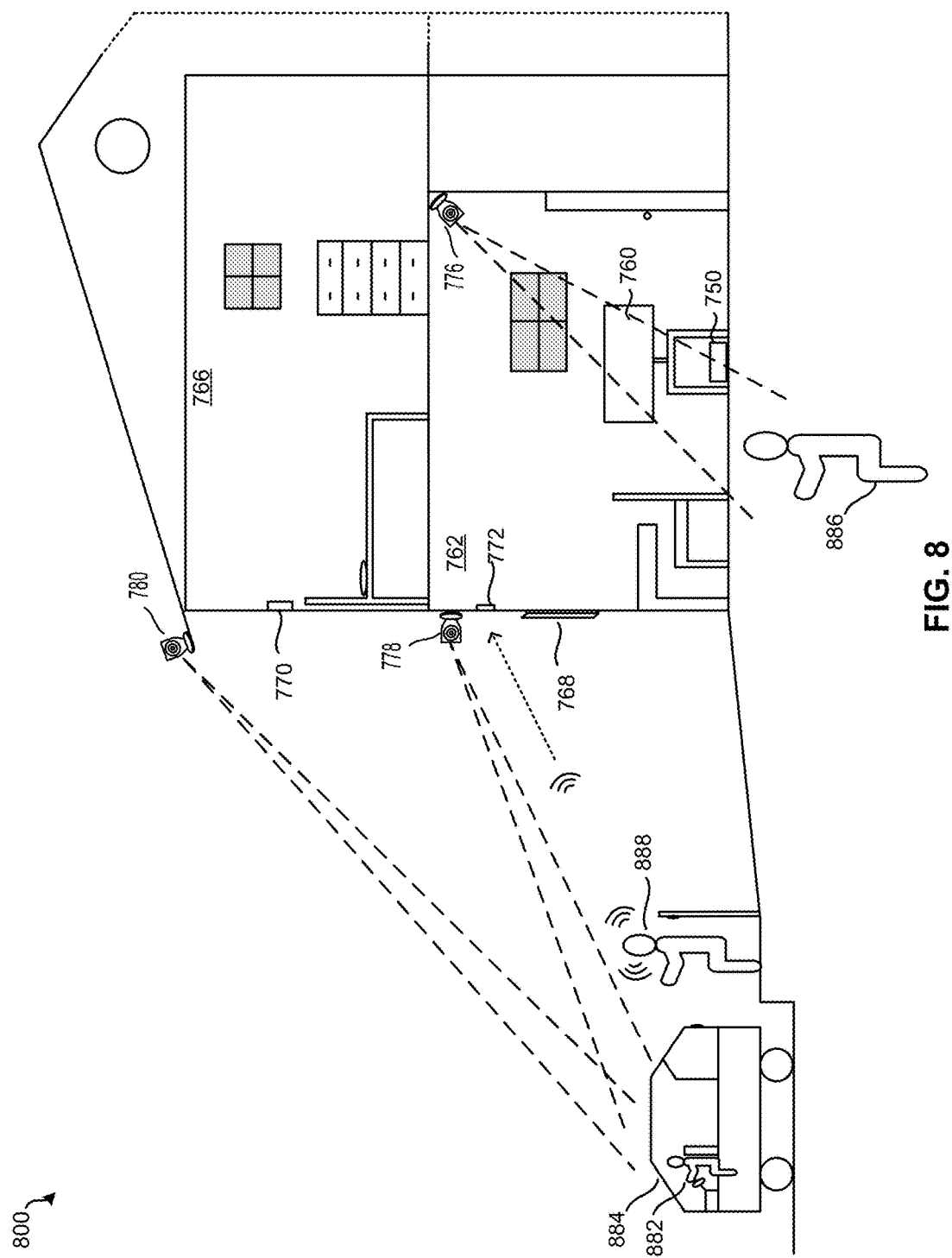
FIG. 8 illustrates a structure that includes a dwelling and a home automation system connected to the dwelling with sensors viewing an environment outside of the dwelling, according to embodiments of the present technology.

FIG. 8 illustrates a structure 800 that includes a dwelling and a home automation system connected to the dwelling with sensors viewing an environment outside of the dwelling, according to embodiments of the present technology. The structure 800 is similar to structure 700 shown in FIG. 7, but only part of the structure is shown in FIG. 8 so as to show the environment outside of structure 800. As shown in FIG. 8, sensors 778 and 780 may capture video, images, and/or audio of people or objects outside of structure 800. For example, as shown in FIG. 8, sensors 778 and 780 may capture video or images of a vehicle 884 parked or driving on the street outside of structure 800. Furthermore, sensors 778 and 780 may capture video or images of people, such as a person 882, inside the vehicle 884, such as video or images that include the faces of such people. Sensors 778, 780, 770 and/or 768 may also capture audio or other data associated with such objects or people. For example, the sensors may collect data related to the sounds made by the vehicle itself, such as sounds made by the engine, tires, horn, etc. of the vehicle 884.

After collecting data associated with the people and/or objects outside the structure, the data may be analyzed to determine characteristics or features of the people and/or objects related to which data was captured by the home automation sensors. For example, image recognition may be used to analyze video or images captured by the home automation sensors. Image recognition may be used to determine characteristics or features of a person's body, such as facial features, height, weight, hair color, facial structure, or other characteristics. Audio recognition may be used to determine characteristics or features of a person's voice. For example, characteristics of a person's voice may be used to recognize the identify of that person based on their voice, such as if characteristics of the person's voice are known by the home automation system due to a previous encounter with that person, or due to those characteristics being stored in a local database within the home automation system or received from a remote database. These characteristics may be used to determine who a person is, either by searching within a database of such characteristics (e.g. a database used by a law enforcement agency, located within the home automation system itself, used by a neighborhood watch organization, among others) or by comparing the characteristics to corresponding characteristics in a different video or picture collected from a different source (e.g. from television programming received at the television receiver 750). Audio recognition may also be used to determine characteristics or features of an object. For example, certain audio may be associated with a certain type of vehicle. More specifically, a certain type of vehicle may have a certain type of horn sound, may have certain type or size of tire that is recognizable by sound, or may have certain sounds that can be used to identify the type of engine used in the vehicle. These characteristics may be used to determine which car produced the sound(s). The vehicle may be recognized by the sounds it makes down to the make, model, year, and other features that may be a part of the vehicle.

Video camera sensor 776 may, similar to sensors 778 and/or 780, capture video or images of people or objects outside of dwelling 800. Since video camera 776 is inside structure 880 (more specifically, within room 762), it may view people and/or objects outside of structure 800 through a window, such as window 890, or other opening from the inside of the structure to the outside of the structure. For example, as shown in FIG. 8, video camera sensor 776 may capture images, video or audio associated with person 886 through window 890.

Home automation sensors 770 and/or 772 may be audio sensors (e.g. microphones) or other types of home automation sensors that are capable of capturing information/data from its environment. For example, sensors 770 and 772 may receive audio signals from the voice of a person, such as person 888, outside of structure 800. Sensors 770 and/or 772 may, as noted, use audio recognition to determine characteristics of the audio signals received from person 888. The signals may also be transmitted to a separate device, such as television receiver 750, to analyze the signals received or data captured by the one or more sensors. For example, audio recognition may be used to determine the identity of the person who is the source of the audio signals. Characteristics of the audio signals may be analyzed and determined, and then compared to a database of audio recordings to determine if there is a match with one or more sets of characteristics in the database, and therefore a match with one or more people associated with the stored characteristics. Characteristics may also be analyzed and determined and compared with characteristics from audio captured or received from a different source, such as captured from a television distribution system, via a television receiver such as television receiver 750 or otherwise.

Figure 9:
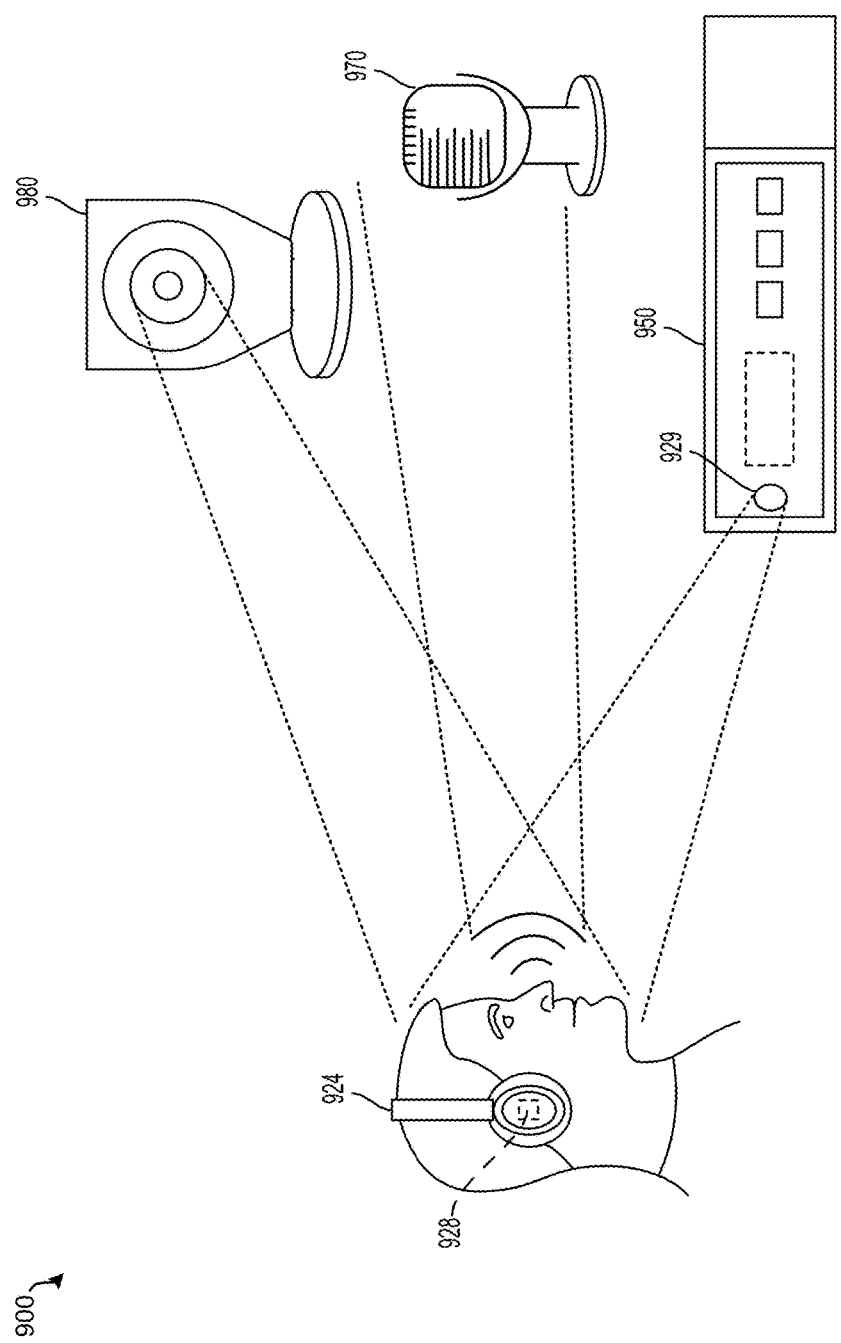
FIG. 9 illustrates a diagram that includes various sensors of a home automation system recording data of an environment including a person, according to embodiments of the present technology.

FIG. 9 illustrates a diagram 900 that includes various sensors of a home automation system recording data of an environment including a person, according to embodiments of the present technology. Diagram 900 includes four different types of sensors, although a home automation system of the present technology may include a variety of other types of home automation sensors. More specifically, diagram 900 includes a video camera sensor 980, an audio sensor 970, an infrared sensor 929 located on television receiver 950, and a sensor 928 in a wireless headset 924. As noted with respect to FIGS. 7 and 8, video camera sensor 980 and audio sensor 970 (e.g. microphone) may capture video, images, and/or audio associated with people or objects in the environment viewed or in the vicinity of those sensors.

Infrared sensor 929 in television receiver 950 may similarly capture data related to people or objects in the vicinity of the television receiver 950. More specifically, infrared sensor 929 in television receiver 950 may capture data associated with a remote control device (not shown) that the sensor is configured to communicate with. The remote control device may allow a user to transmit inputs to the television receiver, or otherwise control the television receiver or any devices connected to or controlled by the television receiver. The infrared sensor 929 may also communicate with or capture data associated with other mobile devices, such as a mobile phone associated with a user of the television receiver or home automation system. Therefore, the infrared receiver 929 may capture and/or record information associated with the user based on the user's use of the mobile device, the user's movements with the mobile device, or other data. Similarly, the infrared sensor may also be configured to communicate with and/or track a mobile device of a person other than a user of the television receiver, such as a person outside the structure that the television receiver is located in (e.g. a person of interest, such as a person of threat). The infrared sensor 929 may also be a different type of sensor and may communicate with such mobile devices in other ways, such as via Bluetooth, wifi, or other types of direct or indirect communication. For example, sensor 929 may include a camera or video camera that may be configured to capture images or video within the structure or outside the structure through a window near the television receiver. Such a camera or video camera sensor 929 may include similar capabilities of video camera sensors 776, 778 and 780 in FIGS. 7 and 8.

As noted, devices with sensors 980, 970 and 929 may capture video, images, audio, etc. of a person of interest, as shown in FIG. 9. However, as also shown in FIG. 9, the diagram 900 includes a sensor within a headset. More specifically, diagram 900 shows sensor 928 within headset 924. While it may be possible to retrieve or collect data from a sensor in a device, such as a headset, worn by a person of interest, such data may be difficult to reach or collect since it may be controlled by someone who is not associated with the user or users who control the home automation or home security system. However, headset 924 with sensor 928 may also be worn by a user. In such a situation, sensor 928 may record various different types of data. For example, sensor 928 may capture audio from the user's voice or from sounds in the environment around the user 924, similar to the data that could be captured, for example, by audio sensor 970. Furthermore, sensor 928 may also include a camera or video camera to capture images and/or video, respectively, from headset 924. For example, sensor 928 may capture such data when the user is moving around inside or outside of the user's dwelling (e.g. the dwelling that is associated with the home automation system described in FIGS. 7 and 8). Sensor 928 may capture, for example, pictures, video and/or audio from people of interest or objects located outside of the dwelling through windows, doors, or other sight lines from inside the dwelling. Furthermore, sensor 928 may capture pictures, video and/or audio from people or objects outside the dwelling when the sensor 928, and therefore the user 926, is located outside the dwelling. For example, sensor 928 may capture a picture or video of a person walking next to the user at the grocery store, or walking down the street near the user's home. In either situation, the person of interest may post a danger or threat to the user, and the user may want to know about the data collected by the sensor 928 within headset 924.

Such sensors may also be located on other types of mobile devices other than headsets. For example, a sensor that captures such data may be located within a mobile phone, an automobile, a boat, an airplane, a smart watch, a set of smart glasses, or a variety of other types of devices or structures that are not located within a dwelling.

Once the data has been captured, either inside or near a dwelling or structure of the user or remote from the dwelling as with sensor 928, the data may be analyzed to determine if the data matches, within a certain differential, data about a person of interest collected at the television receiver from other sources. For example, the sources may include a television program from a television distribution service, data collected from the internet, data inputted by a user, data collected by the same or other sensors within the home automation network, among other sources. This analysis may be done at, for example, the television receiver, at the device with the sensor where the data was recorded, another device within the home automation network, or at a remote device outside of the network.

Although headset 924 is shown in FIG. 9 as being a type of wrap-around headphones, headset 924 may be a variety of other types of headsets. For example, headset 924 may be a single-ear mobile phone Bluetooth headset, may be an ear bud headset, among others. Furthermore, a variety of different types of sensors may be located within headset 924, both those discussed herein and otherwise.

Figure 10:
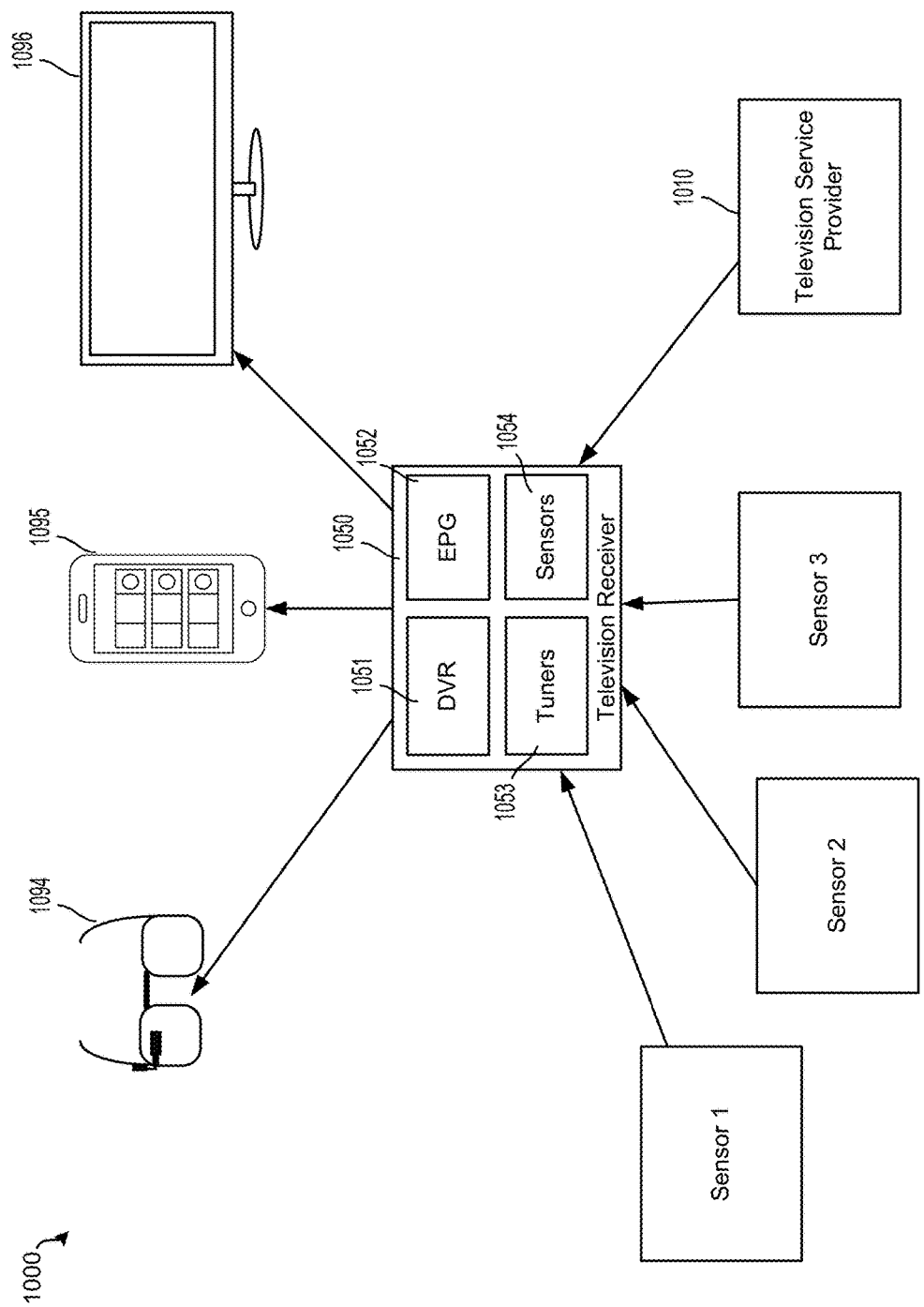
FIG. 10 shows a flow diagram showing the path of data after being collected by a sensor within a home automation system, according to embodiments of the present technology.

FIG. 10 shows a flow diagram 1000 showing the path of data after being collected by a sensor within a home automation system, according to embodiments of the present technology. As noted, a home automation system may include various sensors, including sensor 1, sensor 2, and sensor 3 as shown in FIG. 10. Once data has been collected by one or more of the sensors, the sensors may transmit that data to a central location, such as television receiver 1050. Television receiver 1050 may include a DVR 1051, an EPG 1052, tuners 1053, and/or sensors 1054 (e.g. infrared sensor 929 in FIG. 9). Television receiver 1050 may also periodically retrieve data from the sensors by transmitting queries to the sensors asking the sensors to transmit the latest data to the television receiver. Television receiver 1050 may also receive other data from other sources, such as, for example, television program data from television service provider 1010 (and may display such television programming data via tuners 1053). Television service provider 1010 may provide television receiver 1050 with television programming information, including the programming itself (such as television shows, movies, etc.), information about the programming (such as bibliographic information, title, dates and times of showings, recording dates, program summaries or trailers, etc.), electronic programming guide (EPG) information, among other data. Television receiver 1050 may also generate its own data to contribute to the data to be analyzed. For example, television receiver 1050 may include one or more sensors, as noted herein, that compile data. For example, as shown in FIG. 9, television receiver 1050 may include an infrared sensor, an audio sensor, a video sensor, a camera, etc. to capture data about its surrounding environment.

Data may be detected from television programming received from, for example, television service provider 1010 in a variety of different ways. For example, television receiver 1050 may search data collected from television programming for key search words or terms. For example, television receiver 1050 may generate a database that includes language used in television programming. The database may include terms from written language displayed during a television program, terms generated from speech recognition applied to language spoken by people within the television programming (e.g. an actor in a television show or movie, a news anchor in a news program, etc.). The television receiver 1050 may then search the database for certain terms that may be representative of a person of interest, such as "suspect," "criminal," "murder," "burglary," "restraining order," among others. These terms may be predetermined or may be inputted by a user of the home automation system or television receiver. Programming, or portions of programming, that include such terms being used may be representative of an indication that a virtual person of interest was discussed and/or should be compared to people of interest captured by data from sensors of the home automation system and/or television distribution system. A virtual person may be, for example, a person associated with a television program, a radio program, the internet, or other form of media. A virtual person may also be a person associated with data received at a home automation device from an outside source, such as another home automation system, independent research on the internet or otherwise, etc. The entire set of television shows being broadcast at any given time may be searched, or television receiver 1050 may only search certain types of shows (i.e. "trigger" shows) that are known to broadcast information regarding potential suspects or people of interest. Such trigger shows may include local news programming, twenty-four hour news stations (e.g. CNN), America's Most Wanted, or other television shows. Television receiver 1050 may also search, using such search terms or otherwise, through shows that may be stored in a DVR of television receiver 1050.

Television receiver 1050 may also receive data regarding predetermined people of interest from the authorities. For example, television receiver 1050 may receive, retrieve, or search the internet for information regarding potential people of interest. Local or national police organizations or other government organizations may broadcast or post information regarding people of interest, including most wanted lists, sex offender registries, and other information associated with crimes committed locally or nationally. Television receiver 1050 may also retrieve information regarding people of interest from certain websites on the internet.

The data retrieved, received, collected, and/or generated at television receiver 1050 may be analyzed to determine whether the data received from one or more sensors within the home automation system (and are associated with, for example, a person of interest in the environment of the home automation system) sufficiently match a "virtual" person of interest associated with data received from another source, such as the television service provider. In other words, a comparison may be done to determine if data associated with a person and captured by a home automation system or other sensors connected to the home automation system is actually reflective of a person that may be dangerous or threatening to the user (i.e. that the user or users who control the home automation system should be concerned about a threat based on the data captured by their home automation system).

A "virtual" person of interest as discussed herein may be a picture, video, or other data that may or may not be associated with a real person, but was received from an external source such as a television service provider, or within programming received from the television service provider. For example, data associated with a virtual person of interest may include a sketch generated by a sketch artist or a computer program that was displayed on a news program asking viewers to help the authorities to locate the real person associated with the sketch. On the other hand, data associated with a virtual person of interest may include an actual photograph or video of a person of interest, but which may have an image of a person of interest that may be difficult to see or make out. In another example, data associated with a virtual person of interest may include a real mugshot of a person of interest. However, the data may be described as "virtual" because the data was not captured first-hand and/or in real-time by the home automation system itself, but instead was received by a third party person or organization (e.g. television service provider).

There are a variety of different ways for the television receiver 1050, or another device, to determine whether data captured by one or more sensors of the home automation system includes data sufficient to show that the person(s) or object(s) associated with the data represent a threat or danger to the user and/or the structure associated with the user and/or the home automation system. As noted, the data may be compared to data associated with a known virtual person of interest. This known virtual person of interest may be associated with data displayed or otherwise included in a television program or other transmission from the television receiver (e.g. originally received from the television service provider). For example, the data may include a mugshot, security camera picture/video, eyewitness account, or other data associated with a person of interest. The data collected/captured by the one or more home automation sensors of the home automation system may be compared to the virtual person of interest data to determine the chances (e.g. in a percentage) that the home automation system data represents or is associated with the same person indicated as the virtual person of interest.

A comparison between data collected by local sensors of the home automation system and data detected in, for example, television programming may be determined and used in a variety of different ways. For example, television receiver 1050 may determine what percentage of a face or another portion of a person's body in two pictures, one received from home automation sensors and one received from a television program, are the same. Television receiver 1050 may use certain predetermined points of comparison to determine such a percentage. For example, television receiver 1050 may have a certain number of points of comparison regarding certain specific physical features of the person shown in each picture, and determine which percentage of those features match within a certain amount of error by comparing those features in each picture. If the data includes video, then the television receiver 1050 may take a snapshot picture of one frame of the video to make such a comparison. These specific predetermined points of comparison may be adjustable by a user of the television receiver 1050, or may be dynamically and/or automatically adjusted based on the type of data being compared. For example, if the data being compared is two sets of audio data, then the types of comparison points may be different than those used for pictures. Further, the comparison points may be changed based on where the data was collected from (e.g. which sensor, which device, where the sensor was located, etc.). Further, the comparison points may be changed based on the quality of the data collected. For example, if the two pictures being compared only include a side view of the person of interest, then the points of comparison may be different than if the pictures include a front view of the person of interest. In another example, if one picture includes a front view and the other picture includes a side view, then only the overlapping portions of the views may be used for the comparison, and thus the points of comparison may be focused on that overlapping portion. Other available forms of comparison, including data analyzed from video recognition, facial or other object recognition, audio recognition, or other types of analysis may be used to make such determinations and comparisons.

The points of comparison may yield a determination that the data is a sufficient match if, for example, a certain threshold percentage or number of points is reached based on the comparison. For example, television receiver 1050 may determine that the data collected by one or more home automation sensors is a sufficient match to data received in a television program if the data matches by at least a certain percentage of the data, or over a certain number of points of interest. For example, if television receiver 1050 is comparing a picture captured by home automation sensor 1 to a mugshot picture detected in a television program received from television service provider 1010, television receiver 1050 may determine that the pictures are a sufficient match if at least seven of the ten predetermined points of interest for that type of picture are determined to match. The threshold number or percentage required to determine a match may automatically and/or dynamically change over time. For example, if one or more pictures in the comparison is determined to be of high quality, then more or fewer points may be required for the threshold to determine a match. In another example, if one or more pictures in the comparison are determined to include a side view of the person, then more or fewer points of comparison may be required based on that observation of the data.

If the data being compared is audio data, other techniques for point comparisons may be used. For example, characteristics such as volume, directionality, accents, and/or other sound characteristics of the detected sounds may be compared. For example, if both audio recordings captured by a home automation sensor and audio recordings received on a news program of an audio recording captured by a police department include a voice with a similar accent and at a similar volume throughout the captured voice audio, then the television receiver 1050 may determine that the voices are a match.

In one embodiment, the television receiver 1050 may generate one or more profiles to be associated with a certain person of interest or virtual person of interest. Such profiles may be generated by television receiver 1050 automatically based on data it collects, generates, or receives over time, or may be created by a user of the television receiver. For example, if television receiver 1050 receives information regarding a certain person of interest from a television program, television receiver 1050 may generate a profile for that person of interest. The profile may include any data (video, audio, pictures, etc.) associated with that person of interest, and may include any data suspected of being associated with that person of interest (e.g. data collected from a home automation sensor that the television receiver 1050 determines may be associated with the person of interest). The television receiver 1050 may store various profiles regarding various persons of interest such that the profiles may be added to later or may be used to search for or against certain new data that has been received either from home automation sensors or from an external source. The profiles may be adjusted, expanded, or refined over time when new information is obtained by the television receiver 1050. Profiles may be associated with an actual person of interest (or non-person of interest) as determined by the television receiver 1050 based on data collected from home automation sensors, or profiles may be associated with a virtual person of interest including data only received from external sources and not including any relevant data from home automation sensors. Each profile may also include sub profiles, where each sub profile may be directed to a certain aspect of the person's characteristics. For example, the profile may include a sub profile for audio characteristics (e.g. the person's voice), a sub profile for physical characteristics (e.g. physical features of the person's body, the person's clothes, etc.), a sub profile for objects associated with the person (e.g. the person's car, the person's mobile devices, etc.), among others.

After television receiver 1050 has determined that the data collected from one or more home automation sensors is a sufficient match to data detected regarding a virtual person of interest such that the user may find the comparison to be of use, television receiver 1050 may transmit certain data or information for the user to view. For example, certain portions of data collected (e.g. pictures being compared, audio, video, etc.) may be displayed on a display device (e.g. television display 1096 in FIG. 10) connected to television receiver 1050. In another example, television receiver 1050 may transmit data to a mobile device controlled by a user to view on the user's mobile device, such as a mobile phone (e.g. mobile phone 1095 in FIG. 10), smart glasses (e.g. smart glasses 1094 in FIG. 10), a smart watch, a tablet computer, a laptop computer, among other devices. The actual data that was used in the comparison by television receiver 1050 may be transmitted to the user so that the user may double-check the comparison, analysis and determination made by the television receiver. In another embodiment, a transformed version of the data may be transmitted. For example, the data may be transmitted with language summarizing the comparison and suggested determination may be transmitted and displayed. The data transmitted to the user and that may be displayed, for example, on the user's mobile device, may include other information to be displayed other than the data itself or information associated with the data, such as queries to the user for the mobile device (or home automation system) to take certain actions based on the possible threat posed by the person of interest, or certain notifications or reminders. Such data to be displayed is described further herein with respect to FIG. 11.

The user may be notified of a potential or determined match in other ways. For example, the television receiver 1050 (or a home automation device) may initiate a text (SMS) or other type of message to the user's mobile device, a message on the user's television display (e.g. an interruption of a program that the user is watching), among others.

Although television receiver 1050 may be used as a central device for collection of data from home automation sensors, television programming, and other sources of data, other devices within the home automation system may be used for this purpose. For example, data from these sources may be transmitted to and collected at one of the devices in the home automation system, at a mobile device, at a separate home automation control device, among others.

The data captured by home automation devices/sensors and detected by a television receiver or home automation device, and analysis or determinations made by those devices about the collected data, may be used as part of a neighborhood watch system with, for example, neighbors of the user. For example, the home automation system and/or television receiver could send notifications, data, etc. (e.g. similar to the data displayed on the user's mobile device, as discussed further with respect to FIG. 11) to neighbors of the user so that the neighbors can be aware of a potential person of interest. This may be most relevant if/when the user is out of town or not at the user's home (e.g. at work). The user could set the home automation system to notify neighbors or others in the neighborhood when the user is not available to monitor potential threats. If neighbors have similar home automation systems, the different home automation systems could link together and share data collected (e.g. pictures, video, audio) for a more robust set of data to be analyzed by the different home automation systems. In one example, two or more home automation systems in the neighborhood may detect the same person of interest, object, or action happening in the neighborhood. Due to the different home automation systems and the sensors/devices in those home automation systems being situated at the different users' houses, the data captured by each home automation system may be different from system to system even though the people, objects, and/or actions being detected are the same or similar. For example, a video camera sensor in one home automation system at one user's house may have a different angle of a person of interest than a video camera sensor in a different home automation system in the neighborhood.

Different home automation systems may work together to achieve more robust and/or more accurate determinations about people, objects, or actions of interest in the neighborhood. For example, the home automation systems may be set to only send notifications, or communications to the authorities, if more than one home automation system determines that a certain person or object is a threat. Furthermore, users may be able to weigh the size of the threat based on how many different home automation systems capture data about the person, object or action, and the analysis and/or determination that the home automation systems make about the situation. Data associated with the different home automation systems may be set to automatically share data collected and/or analysis made based on the data collected. The multiple home automation systems may be connected to the same network or to different networks that communicate with each other.

In one example, different home automation systems may determine when a threat is present due to a potential person of interest. For example, if a person of interest is detected performing a certain action multiple times to different homes in a neighborhood where the action is deemed to be threatening or indicative of an intruder or person of interest presence, then the home automation system(s) may designate that person of interest as dangerous. For example, if a user is detected as jiggling the door handle at one or more than one of multiple homes in the neighborhood, then the home automation systems may each detect the door jiggling at their respective home, and then share that information with the other home automation systems, or compile that information at a central location. Then it may be determined that the person of interest is attempting to intrude into one or more of the homes in the neighborhood based on the door handle jiggling.

In another example, other actions may be detected. For example, the home automation system(s) may detect a user attempting to look into windows of one or more homes in the neighborhood. A home automation device may detect such an action at the home that the home automation device is associated with, and also may detect a similar action at a different home. For example, if the home automation device is a video camera that has a view of a portion of the neighbor's house, or an audio microphone that can hear noise from the neighbor's house, then the device may record data, such as actions by a person of interest, at a neighbor's home. Other actions may also be detected, such as actions that may indicate that a person of interest is performing threatening or dangerous actions, or actions that indicate that the person of interest may do something dangerous of intrusive in the future.

Figure 11:
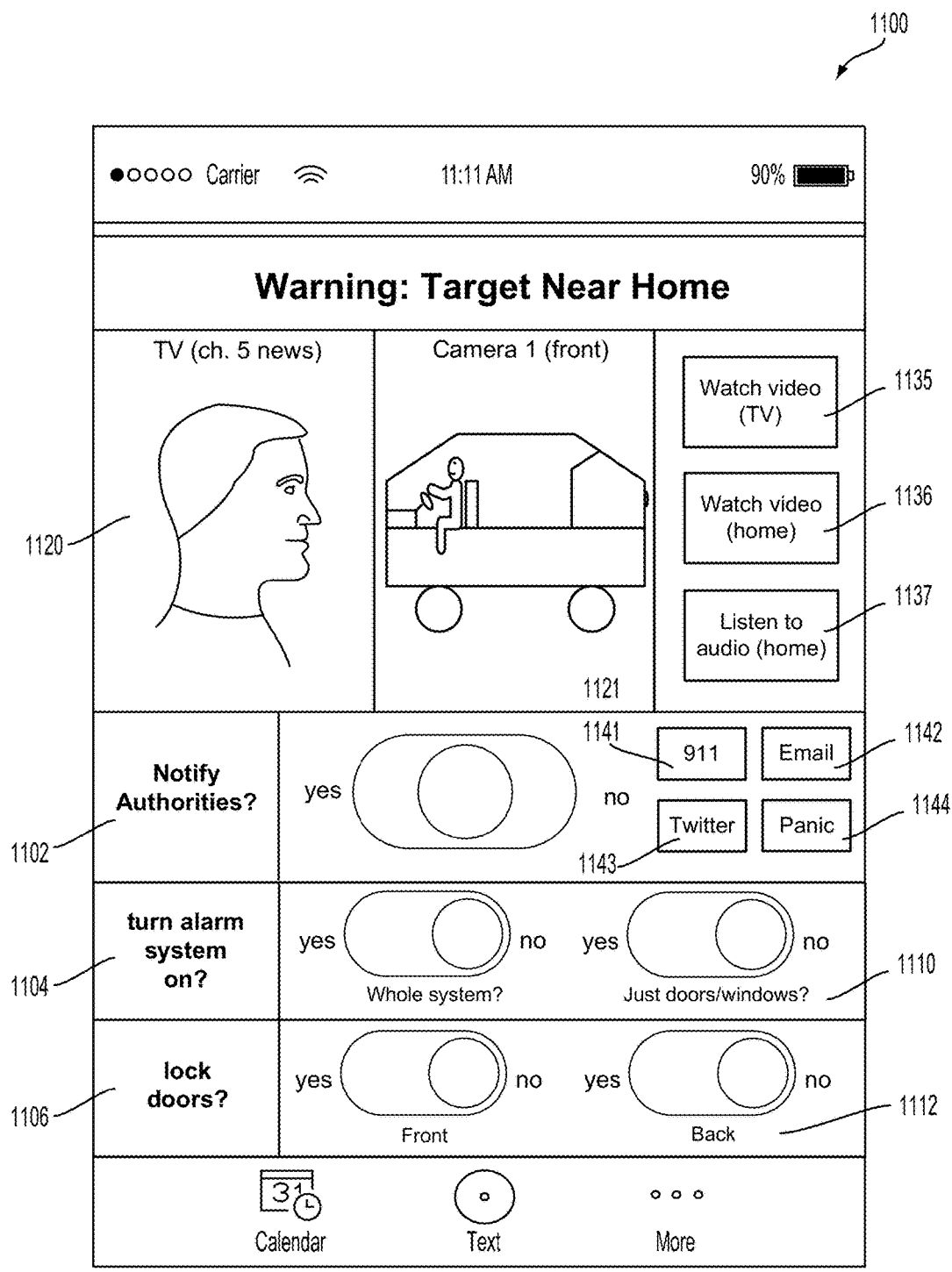
FIG. 11 shows a graphical user interface (GUI) on a display connected to a home automation system, according to embodiments of the present technology.

FIG. 11 shows a graphical user interface (GUI) on a display 1100 connected to a home automation system, according to embodiments of the present technology. The GUI may be located on a mobile device, television, or other device connected to a home automation system for a user to receive queries and/or input responses to the queries or other preferences.

Display 1100 may include one or more pieces of data presented to a user of the mobile device. The data may be related to a determination that the home automation system has made, and/or an action that the television receiver has directed to a home automation system, or another system or device, to take based on that determination. For example, if a television receiver or home automation device has determined that data collected by sensors of the home automation system is sufficiently similar to a virtual person of interest as advertised in a television program, and it believes that the user should be warned, then the home automation system may transmit a communication to a mobile device that includes data for the mobile device to display for the user.

For example, as shown on display 1100, two pictures may be displayed for the user, one of which may have been captured by a home automation sensor (e.g. picture 1121 captured by camera 1 of the home automation system, the action of which is represented by video camera 778 or 790 in FIG. 8), and the other of which may have been detected in a television program by television receiver 1050 (e.g. picture 1120 detected in a "Ch. 5 news" program on the television). These two pictures may be the same pictures used for comparison when the television receiver 1050 determined that the pictures were sufficiently similar such that the person of interest may pose a threat or may be relevant for the user to see. Furthermore, other information or data may be displayed on display 1100. For example, buttons 1135, 1136 and 1137 may be displayed. Button 1135 may allow a user to watch a video associated with the pictures 1120 and 1121, or the person of interest they show, on the display. Specifically, button 1135 may allow the user to watch the television broadcast associated with the "ch. 5 news" program detected by the television receiver 1050. Button 1136 may also allow the user to view a video associated with the person of interest. More specifically, button 1136 may allow the user to watch a video captured by the home automation system that took the picture 1121 shown on display 1100. Button 1137 may allow the user to listen to audio associated with the person of interest. Additional (or fewer) or different buttons may be displayed on display 1100 for the user to use to accomplish certain tasks associated with determining whether the user wants to take action based on the perceived threat associated with the person of interest.

Display 1100 may also include one or more queries presented to a user of the mobile device. The queries may be related to a determination that the home automation system has made, and/or an action that the television receiver has directed to a home automation system, or another system or device, to take based on that determination. For example, if a television receiver or home automation device has determined that data collected by sensors of the home automation system is sufficiently similar to a virtual person of interest as advertised in a television program, and it believes that the user should be warned, then the home automation system may transmit a communication to a mobile device that includes the display for the mobile device to display the query to the user.

In FIG. 11, display 1100 includes 4 different queries 1102-1106, and additional sub-queries 1110 and 1112. The first query, query 1102, asks the user whether the user would like to notify the authorities based on the displayed data (e.g. pictures, video, audio, etc. shown above the queries). If the user does not want to take that action, the user may slide the button to "no". If the user slides the button to "no", then the rest of the queries may become moot and disappear from display 1100. Other queries may still be relevant, and may remain for the user to use. As such, the different queries may be related to each other, and actions may be taken on one query based on a user's answer to a different query. Furthermore, any response, or a communication indicating a lack of response, may be transmitted from the mobile device to the home automation system or security system to indicate that the user may not be helpful for making a decision. The user may set the home automation system to take action on its own, automatically, based on such an action or lack of action by the user after such information is transmitted to the home automation system. This information may supplement (e.g. confirm, deny, etc.) the determination that the home automation system had already made based on the devices' observations from within the home automation system.

Additional data regarding the mobile device may be used to determine the accuracy of a non-response from the user. For example, the mobile device and/or home automation system may be the global positioning system (GPS) within the mobile device to determine if the mobile device is with or near the user. Other techniques may also be used to determine this accuracy or lack thereof. For example, home automation sensors within the home automation system may be able to observe the environment of the user and determine whether the user is near the mobile device. For example, if one sensor determines that the user is in one room, and another sensor determines that the mobile device is in a different room, the home automation system may determine that a non-response from the user at the mobile device is not indicative of an accurate state of the user.

Other queries, such as queries 1104-1108 may be used to both determine what the user's preferences are with respect to home automation and security system devices based on the user's observations of the data presented to it. However, other queries may be presented based on the situation and the data presented. For example, query 1104 may be presented to the user to determine if the user wants to turn on the alarm system and query 1106 to determine if the user wants to lock the doors. Furthermore, subquery 1110 may be presented to determine whether the user wants to turn on the whole alarm system or only certain portions of the alarm system, and subquery 1112 may be presented to the user to determine if the user wants to lock the front door or back door or both. Any response, or a communication indicating a lack of response, may be transmitted from the mobile device to the home automation system or security system to indicate whether the user is awake or not. This information may supplement (e.g. confirm, deny, etc.) the determination that the home automation system had already made based on the devices' observations from within the home automation system.

In an example, if a user indicates via the GUI that the user wants to turn on the alarm system, for example by sliding one of the two buttons associated with that query to a "yes" position, then the mobile device may transmit this information to the home automation system and/or security system and the appropriate system may take action based on those inputs by the user, or may instruct the appropriate device to do so. The system may also override any determination it previously made about what action to take based on home automation sensors' observations of the user, since the user entered an active input and concrete answer to the system's queries.

The user may provide useful information to the display without receiving a query from the mobile device shown on the display. For example, the user may provide settings or conditions that are representative of the user's preferences or patterns without the home automation system having to determine such preferences and/or patterns on its own. Display 1100 may also be used for the user to periodically make inputs to tell the GUI, and therefore the home automation and/or security systems, what its preferences are. For example, a user may indicate in a list of settings that the user wants the security system to be turned on after a certain amount of time has passed after data associated with a person of interest has been displayed on display 1100, for example if the security system has not already been turned on manually as of that time. In another example, a user may indicate that the user wants the security system to be turned on if the television receiver determined that the probability of a match between the person of interest captured in data by the home automation system and a virtual person of interest detected on a television program is higher than a certain threshold percentage of point match. This indication may serve as a constructive determination that the user wants the alarm system on due to the possible threat or that the user is not near its phone and can't make a determination and wants to protect its home due to the possible threat.

Display 1100 may also allow the user to notify the authorities about the possible determined threat or safety concern by pressing one or more of buttons 1141, 1142, 1143 and 1144. For example, the user may be able to alert the authorities by calling (e.g. via the mobile device if the display 1100 is on a mobile phone, for example) the police as triggered by pressing button 1141 (or by, for example, pressing the "panic" button 1144. Furthermore, the user may be able to communicate with the authorities, or other relevant contacts, via e-mail and/or social media using buttons 1142 and/or 1143, respectively. The user may set the mobile device to automatically contact the relevant authorities or contact for each button so that, for example, the user does not have to remember the correct phone number, e-mail address, or social media contact address for the relevant authority associated with each button. Such data may be uploaded to, stored at, and collected by a cloud network or other real-time sharable storage device or network.

Figure 12:
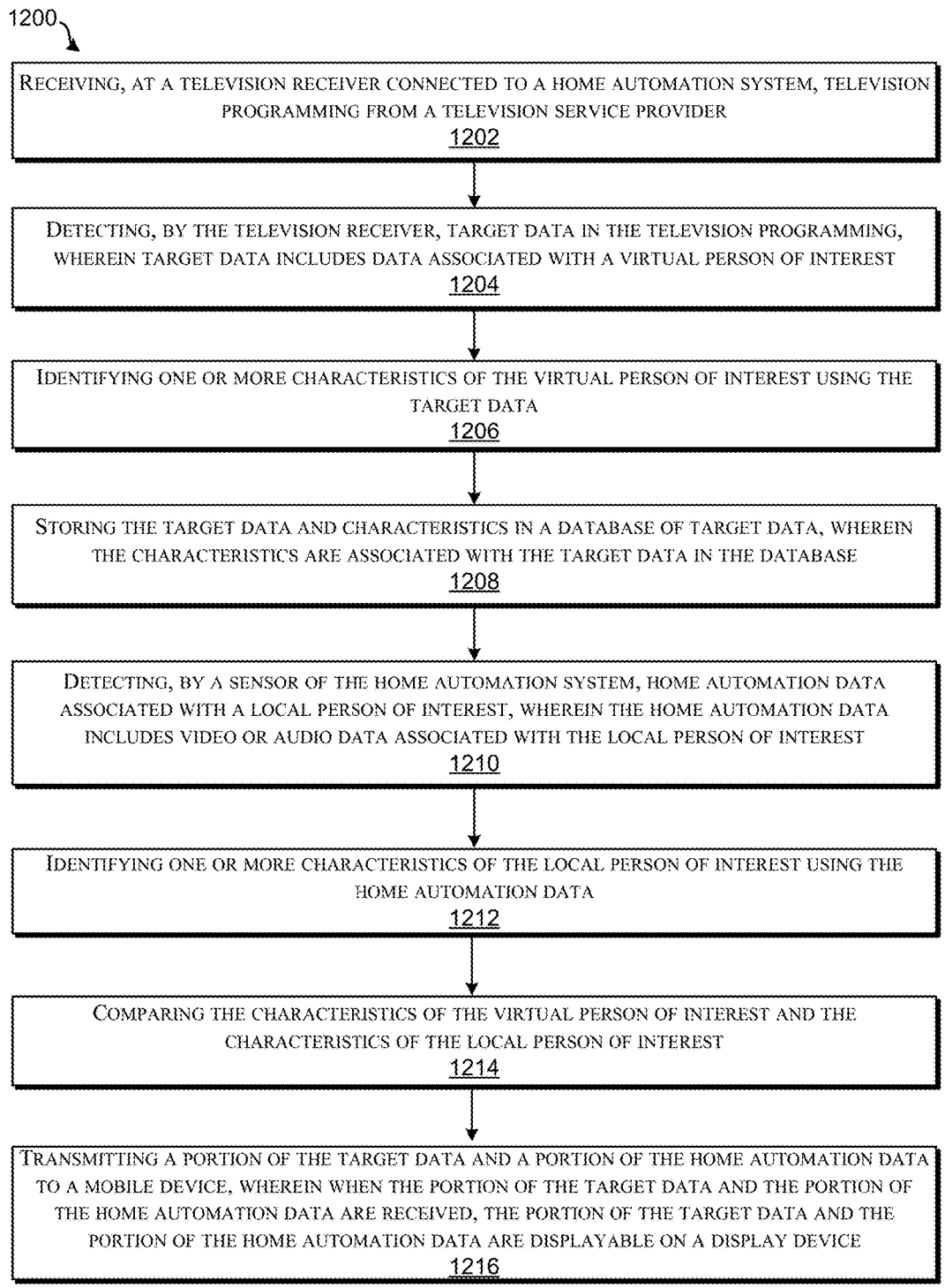
FIG. 12 is a flow chart of an example process used to identify a person using a home automation system, according to embodiments of the present technology.

FIG. 12 is a flow chart of an example process used to identify a person of interest using a home automation system, according to embodiments of the present technology. More specifically, FIG. 12 is a flow chart of an example process to use data collected from a television distribution system and data collected by sensors in a home automation system to identify a person of interest. Step 1202 includes receiving, at a television receiver connected to a home automation system, television programming from a television service provider. Step 1204 includes detecting, by the television receiver, target data in the television programming, wherein target data includes data associated with a virtual person of interest. Step 1206 includes identifying one or more characteristics of the virtual person of interest using the target data. Step 1208 includes storing the target data and characteristics in a database of target data, wherein the characteristics are associated with the target data in the database. Step 1210 includes detecting, by a sensor of the home automation system, home automation data associated with a local person of interest, wherein the home automation data includes video or audio data associated with the local person of interest. Step 1212 includes identifying one or more characteristics of the local person of interest using the home automation data. Step 1214 includes comparing the characteristics of the virtual person of interest and the characteristics of the local person of interest. Step 1216 includes transmitting a portion of the target data and a portion of the home automation data to an electronic device, wherein when the portion of the target data and the portion of the home automation data are received, the portion of the target data and the portion of the home automation data are displayable on a display device.

Figure 13:
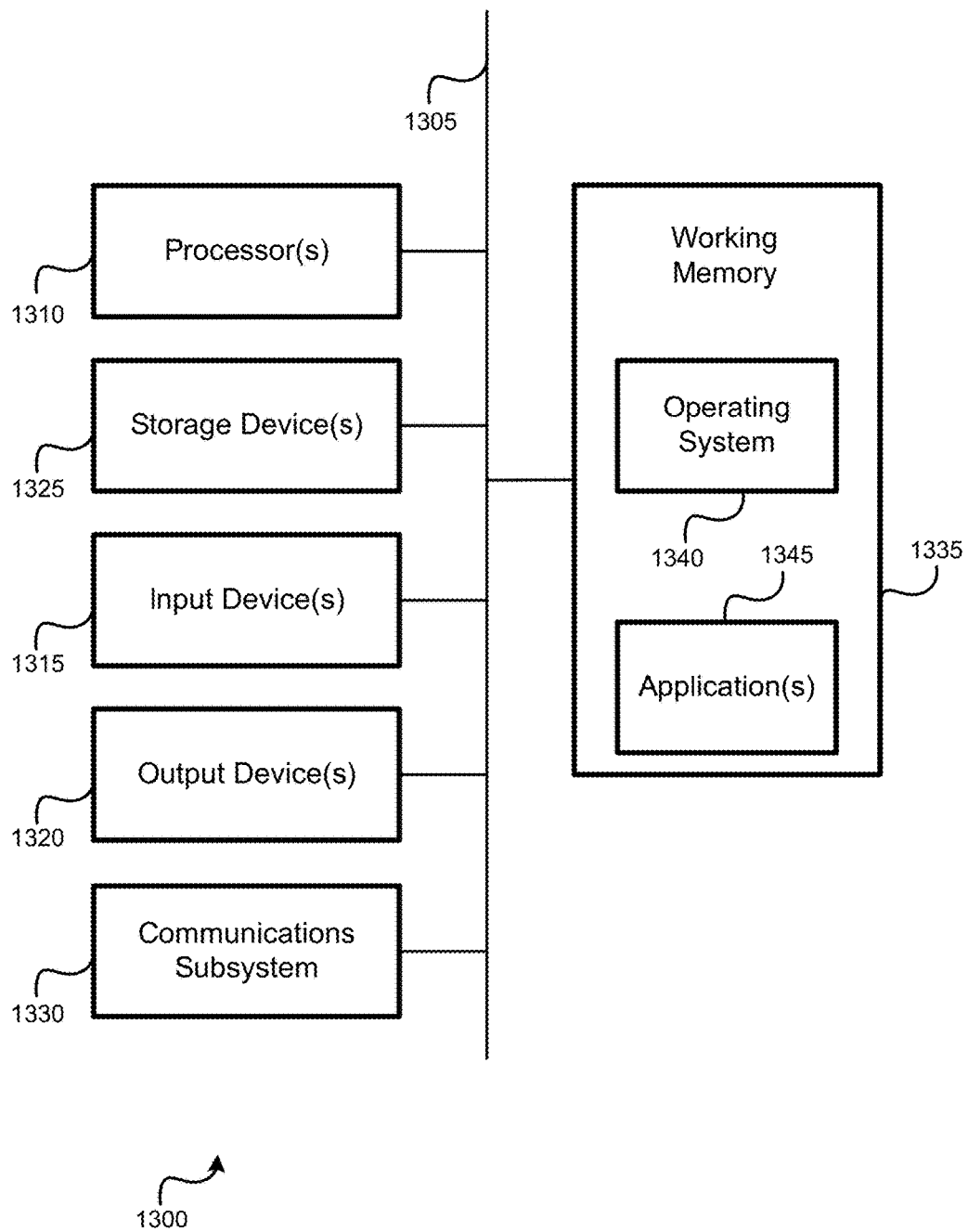
FIG. 13 shows a simplified computer system that may be utilized to perform one or more of the operations discussed.

FIG. 13 illustrates an embodiment of a computer system 1300. A computer system 1300 as illustrated in FIG. 13 may be incorporated into devices such as a STB, a first electronic device, DVR, television, media system, personal computer, and the like. Moreover, some or all of the components of the computer system 1300 may also be incorporated into a portable electronic device, mobile phone, or other device as described herein. FIG. 13 provides a schematic illustration of one embodiment of a computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

The computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1300 might also include a communications subsystem 1330, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1330 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1330. In other embodiments, a portable electronic device, e.g. the first electronic device, may be incorporated into the computer system 1300, e.g., an electronic device or STB, as an input device 1315. In many embodiments, the computer system 1300 will further comprise a working memory 1335, which can include a RAM or ROM device, as described above.

The computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1300 to perform methods in accordance with various embodiments of the technology. According to a set of embodiments, some or all of the procedures of such methods are performed by the computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300.

The communications subsystem 1330 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method, the method comprising:
   receiving, at a television receiver connected to a home automation system, television programming from a television service provider;
   detecting, by the television receiver, target data in the television programming, wherein target data includes data associated with a virtual person;
   identifying one or more characteristics of the virtual person using the target data;
   storing the target data and characteristics in a database of target data, wherein the characteristics are associated with the target data in the database;
   detecting, by a sensor of the home automation system, home automation data associated with a local person, wherein the home automation data includes video or audio data associated with the local person;
   identifying one or more characteristics of the local person using the home automation data;
   comparing the characteristics of the virtual person and the characteristics of the local person;
   transmitting a portion of the target data and a portion of the home automation data to an electronic device, wherein when the portion of the target data and the portion of the home automation data are received, the portion of the target data and the portion of the home automation data are displayable on a display device.

2. The method of claim 1, further comprising:
   receiving, at the television receiver, additional data associated with the virtual person, wherein the additional data is received from an internet website.

3. The method of claim 1, wherein the target data includes a picture of a suspected criminal shown in a television program.

4. The method of claim 1, wherein the one or more characteristics of the local person include facial features associated with the local person.

5. The method of claim 1, further comprising:
   transmitting an alert communication, wherein the alert communication includes an alert to a law enforcement organization, and wherein the alert communication includes the portion of the target data and the portion of the home automation data.

6. The method of claim 1, wherein the one or more characteristics of the local person includes features of a vocal sound associated with the person.

7. The method of claim 1, further comprising:
   determining, using the comparison of the characteristics of the virtual person and the characteristics of the local person, that the characteristics of the virtual person and the characteristics of the local person have a certain number of matching characteristics; and
   determining that the certain number of matching characteristics meet or exceed a threshold number of matching characteristics.

8. The method of claim 7, further comprising:
   compiling, at the television receiver, historical home automation data collected over a period of time,
   wherein the threshold number of matching characteristics dynamically adjusts based on the historical home automation data.

9. The method of claim 1, wherein detecting the target data in the television programming includes identifying key words within a television program that are associated with a potential virtual person.

10. The method of claim 1, wherein detecting the target data in the television programming includes receiving an input from a user of the television receiver, wherein the input from the user includes an indication that the virtual person is included in a television program being shown on a display connected to the television receiver.

11. A television receiver, comprising:
    one or more processors;
    a wireless transceiver communicatively coupled to the one or more processors;
    a non-transitory computer readable storage medium communicatively coupled to the one or more processors, wherein the non-transitory computer readable storage medium includes instructions that, when executed by the one or more processors, cause the one or more processors to perform operations including:
       receiving, at a television receiver connected to a home automation system, television programming from a television service provider;
       detecting, by the television receiver, target data in the television programming, wherein target data includes data associated with a virtual person;
       identifying one or more characteristics of the virtual person using the target data;
       storing the target data and characteristics in a database of target data, wherein the characteristics are associated with the target data in the database;
       detecting, by a sensor of the home automation system, home automation data associated with a local person, wherein the home automation data includes video or audio data associated with the local person;
       identifying one or more characteristics of the local person using the home automation data;
       comparing the characteristics of the virtual person and the characteristics of the local person;
       transmitting a portion of the target data and a portion of the home automation data to an electronic device, wherein when the portion of the target data and the portion of the home automation data are received, the portion of the target data and the portion of the home automation data are displayable on a display device.

12. The television receiver of claim 11, wherein the operations further include:
    receiving, at the television receiver, additional data associated with the virtual person, wherein the additional data is received from an internet website.

13. The television receiver of claim 11, wherein the target data includes a picture of a suspected criminal shown in a television program.

14. The television receiver of claim 11, wherein the one or more characteristics of the local person include facial features associated with the local person.

15. The television receiver of claim 11, wherein the operations further include:
   transmitting an alert communication, wherein the alert communication includes an alert to a law enforcement organization, and wherein the alert communication includes the portion of the target data and the portion of the home automation data.

16. The television receiver of claim 11, wherein the one or more characteristics of the local person includes features of a vocal sound associated with the person.

17. The television receiver of claim 11, wherein the operations further include:
   determining, using the comparison of the characteristics of the virtual person and the characteristics of the local person, that the characteristics of the virtual person and the characteristics of the local person have a certain number of matching characteristics; and
   determining that the certain number of matching characteristics meet or exceed a threshold number of matching characteristics.

18. The television receiver of claim 17, wherein the operations further include:
   compiling, at the television receiver, historical home automation data collected over a period of time,
   wherein the threshold number of matching characteristics dynamically adjusts based on the historical home automation data.

19. The television receiver of claim 11, wherein detecting the target data in the television programming includes identifying key words within a television program that are associated with a potential virtual person.

20. A non-transitory computer readable medium comprising instructions that, when executed by one or more processors, cause the one or more processors to perform operations including:
   receiving, at a television receiver connected to a home automation system, television programming from a television service provider;
   detecting, by the television receiver, target data in the television programming, wherein target data includes data associated with a virtual person;
   identifying one or more characteristics of the virtual person using the target data;
   storing the target data and characteristics in a database of target data, wherein the characteristics are associated with the target data in the database;
   detecting, by a sensor of the home automation system, home automation data associated with a local person, wherein the home automation data includes video or audio data associated with the local person;
   identifying one or more characteristics of the local person using the home automation data;
   comparing the characteristics of the virtual person and the characteristics of the local person;
   transmitting a portion of the target data and a portion of the home automation data to an electronic device, wherein when the portion of the target data and the portion of the home automation data are received, the portion of the target data and the portion of the home automation data are displayable on a display device.

* * * * *